United States Patent
Luo et al.

(10) Patent No.: US 11,432,213 B2
(45) Date of Patent: Aug. 30, 2022

(54) GAP SWITCH FOR WIRELESS SYSTEMS WITH MULTIPLE PARENTS

(71) Applicant: QUALCOMM Incorporated, San Diego, CA (US)

(72) Inventors: Jianghong Luo, Skillman, NJ (US); Navid Abedini, Basking Ridge, NJ (US); Luca Blessent, Whitehouse Station, NJ (US); Naeem Akl, Somerville, NJ (US); Tao Luo, San Diego, CA (US); Karl Georg Hampel, Hoboken, NJ (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 26 days.

(21) Appl. No.: 17/158,635

(22) Filed: Jan. 26, 2021

(65) Prior Publication Data
US 2021/0235345 A1    Jul. 29, 2021

Related U.S. Application Data

(60) Provisional application No. 62/966,130, filed on Jan. 27, 2020.

(51) Int. Cl.
*H04W 36/08* (2009.01)
*H04L 5/00* (2006.01)
*H04W 36/16* (2009.01)

(52) U.S. Cl.
CPC ........... *H04W 36/08* (2013.01); *H04L 5/0094* (2013.01); *H04W 36/16* (2013.01)

(58) Field of Classification Search
CPC ............. H04W 36/08; H04W 36/16; H04W 84/047; H04W 92/04; H04W 36/0011; H04W 40/12; H04W 40/22; H04W 40/28; H04L 5/0094; H04L 5/0032; H04L 5/0007

See application file for complete search history.

(56) References Cited

FOREIGN PATENT DOCUMENTS

WO   WO-2021006594 A1 *  1/2021
WO   WO-2021006636 A1 *  1/2021

OTHER PUBLICATIONS

International Search Report and Written Opinion—PCT/US2021/015273—ISA/EPO—dated Mar. 31, 2021.

(Continued)

*Primary Examiner* — Magdi Elhag
(74) *Attorney, Agent, or Firm* — Patterson + Sheridan, LLP

(57) ABSTRACT

Aspects of the present disclosure provide techniques switching a communication link for wireless systems with multiple parents, such as an Integrated Access and Backhaul (IAB) network or other type of network. In some cases, a node determines a partition of a number of desired guard symbols between a first parent node and a second parent node; sends, to the first parent node and to the second parent node, at least one indication of a partitioned number of the desired guard symbols for switching between the first parent node and the second parent node; receives at least one indication of a number of provided guard symbols from the first and second parent nodes; and switches a communication link from the first parent node to the second parent node in accordance with the at least one indication of provided guard symbols by the first parent node and the second parent node.

30 Claims, 17 Drawing Sheets

(56) References Cited

OTHER PUBLICATIONS

Nokia, et al., "Open Items with IAB Case #1 Timing", 3GPP Draft, 3GPP TSG RAN WG1#97, R1-1907117_IAB OTA Timing, 3rd Generation Partnership Project (3GPP), Mobile Competence Centre, 650, Route Des Lucioles, F-06921 Sophia-Antipolis Cedex, France, RAN WG1, No. Reno, USA, May 13-17, 2019, May 3, 2019 (May 3, 2019), XP051709146, 5 Pages, Retrieved from the Internet: URL:http://www.3gpp.org/ftp/tsg%5Fran/WG1%5FRL1/TSGR1%5F97/Docs/R1%2D1907117%2Ezip [retrieved on May 3, 2019] Section 2.4.

WI Rapporteur (Qualcomm Incorporated): "Upper Layers Parameters to Support IAB Physical Layer Operation", 3GPP Draft, 3GPP TSG RAN WG1 Meeting #98bis, R1-1911724—Upper Layers Parameters to Support IAB Physical Layer Operation, 3rd Generation Partnership Project (3GPP), Mobile Competence Centre, 650, Route Des Lucioles, F-06921 Sophia, vol. RAN WG1, No. Chongqing, China, Oct. 14-20, 2019, Oct. 30, 2019 (Oct. 30, 2019), XP051812936, 11 Pages.

\* cited by examiner

Switch types for transitions between MT and DU

| MT to DU | DL Tx | UL Rx |
|---|---|---|
| DL Rx | | |
| UL Tx | | |
| DU to MT | DL Rx | UL Tx |
| DL Tx | | |
| UL Rx | | |

| Switch types defined for switch between (P1, P2) | | |
|---|---|---|
| P1 to P2 | DL Tx | UL Rx |
| DL Tx | | |
| UL Rx | | |
| P2 to P1 | DL Tx | UL Rx |
| DL Tx | | |
| UL Rx | | |

GAP SWITCH FOR WIRELESS SYSTEMS WITH MULTIPLE PARENTS

CROSS-REFERENCE TO RELATED APPLICATION(S)

This application claims benefit of and priority to U.S. Provisional Application No. 62/966,130, filed Jan. 27, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for switching a communication link for wireless systems with multiple parents, such as an Integrated Access and Backhaul (IAB) network or other type of network.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between wireless communication devices.

Certain aspects provide a method for wireless communications by a child node (e.g., a user equipment (UE) or mobile termination component (MT) of an integrated access and backhaul (IAB) network) of a network. The method generally includes determining a partition of a number of desired guard symbols between a first parent node and a second parent node. The method generally includes sending, to the first parent node and to the second parent node, at least one indication of a partitioned number of the desired guard symbols for switching between the first parent node and the second parent node. The method generally includes receiving at least one indication of a number of provided guard symbols from the first and second parent nodes The method generally includes switching a communication link from the first parent node to the second parent node in accordance with the at least one indication of provided guard symbols by the first parent node and the second parent node.

Certain aspects provide a method for wireless communications by a central unit (e.g., a central unit (CU) of an IAB network) of a network. The method generally includes receiving an indication of a number of desired guard symbols from a child node for switching a communication link between a first parent node and a second parent node. The method generally includes partitioning the number of desired guard symbols between the first parent node and the second parent node. The method generally includes transmitting an indication based on the partitioning of the number of desired guard symbols to the first and the second parent nodes.

Certain aspects provide a method for wireless communications by a parent node (e.g., a base station (BS) or a distributed unit (DU) of an IAB network) of a network. The method generally includes receiving at least one indication of a number of desired guard symbols from at least one of a child node and a network entity for the child node to switch between the first parent node and a second parent node. The method generally includes determining a number of provided guard symbols based on one or more indications associated with the second parent node. The method generally includes transmitting an indication of the number of provided guard symbols to the child node.

Certain aspects provide an apparatus for wireless communications (e.g., a UE or MT of an IAB network) of a network. The apparatus generally includes at least one processor, and a memory coupled to the at least one processor. The memory generally includes code executable by the at least one processor to cause the apparatus to determine a partition of a number of desired guard symbols between a first parent node and a second parent node. The memory generally includes code executable by the at least one processor to cause the apparatus to send, to the first parent node and to the second parent node, at least one indication of a partitioned number of the desired guard symbols for switching between the first parent node and the second parent node. The memory generally includes code executable by the at least one processor to cause the apparatus to receive at least one indication of a number of provided guard symbols from the first and second parent nodes The memory generally includes code executable by the at least one processor to cause the apparatus to switch a communication link from the first parent node to the second parent node in accordance with the at least one indication of provided guard symbols by the first parent node and the second parent node.

Certain aspects provide an apparatus for wireless communications (e.g., a CU of an IAB network). The apparatus generally includes at least one processor, and a memory coupled to the at least one processor. The memory generally includes code executable by the at least one processor to cause the apparatus to receive an indication of a number of desired guard symbols from a child node for switching a communication link between a first parent node and a second parent node. The method generally includes partitioning the number of desired guard symbols between the first parent node and the second parent node. The method generally includes transmitting an indication based on the partitioning of the number of desired guard symbols to the first and the second parent nodes.

Certain aspects provide an apparatus for wireless communications (e.g., a BS or DU of an IAB network). The apparatus generally includes at least one processor, and a memory coupled to the at least one processor. The memory generally includes code executable by the at least one processor to cause the apparatus to receive at least one indication of a number of desired guard symbols from at least one of a child node and a network entity for the child node to switch between the apparatus and a second parent node. The memory generally includes code executable by the at least one processor to cause the apparatus to determine a number of provided guard symbols based on one or more indications associated with the second parent node. The memory generally includes code executable by the at least one processor to cause the apparatus to transmit an indication of the number of provided guard symbols to the child node.

Certain aspects provide an apparatus for wireless communications (e.g., a UE or MT of an IAB network). The apparatus generally includes means for determining a partition of a number of desired guard symbols between a first parent node and a second parent node. The apparatus generally includes means for sending, to the first parent node and to the second parent node, at least one indication of a partitioned number of the desired guard symbols for switching between the first parent node and the second parent node. The apparatus generally includes means for receiving at least one indication of a number of provided guard symbols from the first and second parent nodes The apparatus generally includes means for switching a communication link from the first parent node to the second parent node in accordance with the at least one indication of provided guard symbols by the first parent node and the second parent node.

Certain aspects provide an apparatus for wireless communications (e.g., a CU of an IAB network). The apparatus generally includes means for receiving an indication of a number of desired guard symbols from a child node for switching a communication link between a first parent node and a second parent node. The apparatus generally includes means for partitioning the number of desired guard symbols between the first parent node and the second parent node. The apparatus generally includes means for transmitting an indication based on the partitioning of the number of desired guard symbols to the first and the second parent nodes.

Certain aspects provide an apparatus for wireless communications (e.g., a BS or DU of an IAB network). The apparatus generally includes means for receiving at least one indication of a number of desired guard symbols from at least one of a child node and a network entity for the child node to switch between the apparatus and a second parent node. The apparatus generally includes means for determining a number of provided guard symbols based on one or more indications associated with the second parent node. The apparatus generally includes means for transmitting an indication of the number of provided guard symbols to the child node.

Certain aspects provide a computer-readable medium storing computer executable code thereon for wireless communications. The computer-readable medium generally includes code for determining a partition of a number of desired guard symbols between a first parent node and a second parent node. The computer-readable medium generally includes code for sending, to the first parent node and to the second parent node, at least one indication of a partitioned number of the desired guard symbols for switching between the first parent node and the second parent node. The computer-readable medium generally includes code for receiving at least one indication of a number of provided guard symbols from the first and second parent nodes The computer-readable medium generally includes code for switching a communication link from the first parent node to the second parent node in accordance with the at least one indication of provided guard symbols by the first parent node and the second parent node.

Certain aspects provide a computer-readable medium storing computer executable code thereon for wireless communications. The computer-readable medium generally includes code for receiving an indication of a number of desired guard symbols from a child node for switching a communication link between a first parent node and a second parent node. The computer-readable medium generally includes code for partitioning the number of desired guard symbols between the first parent node and the second parent node. The computer-readable medium generally includes code for transmitting an indication based on the partitioning of the number of desired guard symbols to the first and the second parent nodes.

Certain aspects provide a computer-readable medium storing computer executable code thereon for wireless communications. The computer-readable medium generally includes code for receiving at least one indication of a number of desired guard symbols from at least one of a child node and a network entity for the child node to switch between a first parent node and a second parent node. The computer-readable medium generally includes code for determining a number of provided guard symbols based on one or more indications associated with the second parent node. The computer-readable medium generally includes code for transmitting an indication of the number of provided guard symbols to the child node.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
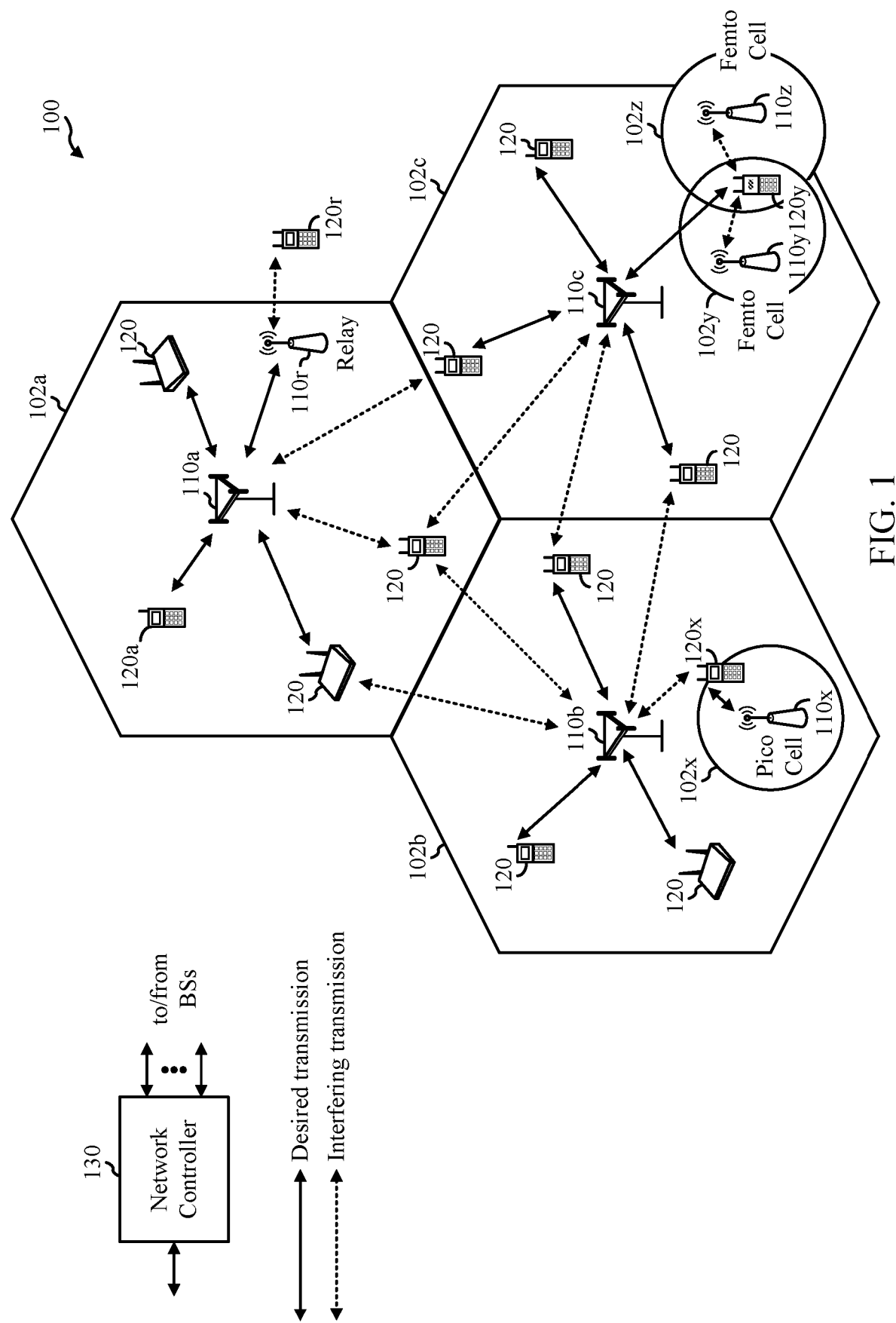
FIG. 1 is a block diagram conceptually illustrating an example wireless communication network, in accordance with certain aspects of the present disclosure.

Aspects of the present disclosure provide techniques for switching a communication link in a wireless network with multiple parents, such as an Integrated Access and Backhaul (IAB) network. In some cases, a first node determines a partition of a number of desired guard symbols between a first parent node and a second parent node; sends, to the first parent node and to the second parent node, at least one indication of a number of the desired guard symbols for switching between the first parent node and the second parent node; receives at least one indication of a number of provided guard symbols from the first and second parent nodes; and switches a communication link from the first parent node to the second parent node in accordance with the at least one indication of provided guard symbols by the first parent node and the second parent node.

The following description provides examples for switching a communication link for wireless systems with multiple parents, such as an IAB network or other type of network, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed.

Figure 8:
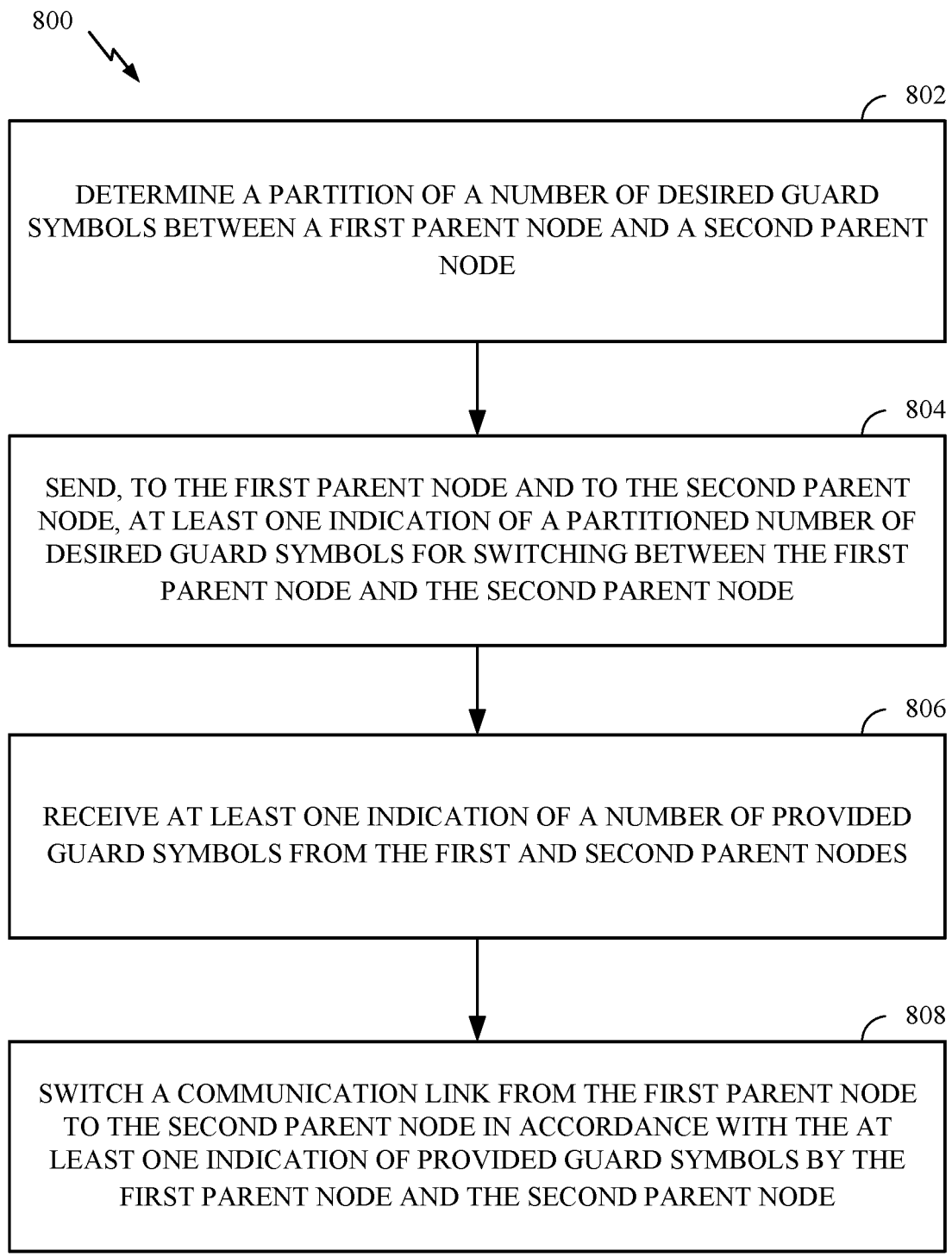
FIG. 8 is a flow diagram illustrating example operations for wireless communication by a child node of a network, in accordance with certain aspects of the present disclosure.
Figure 9:
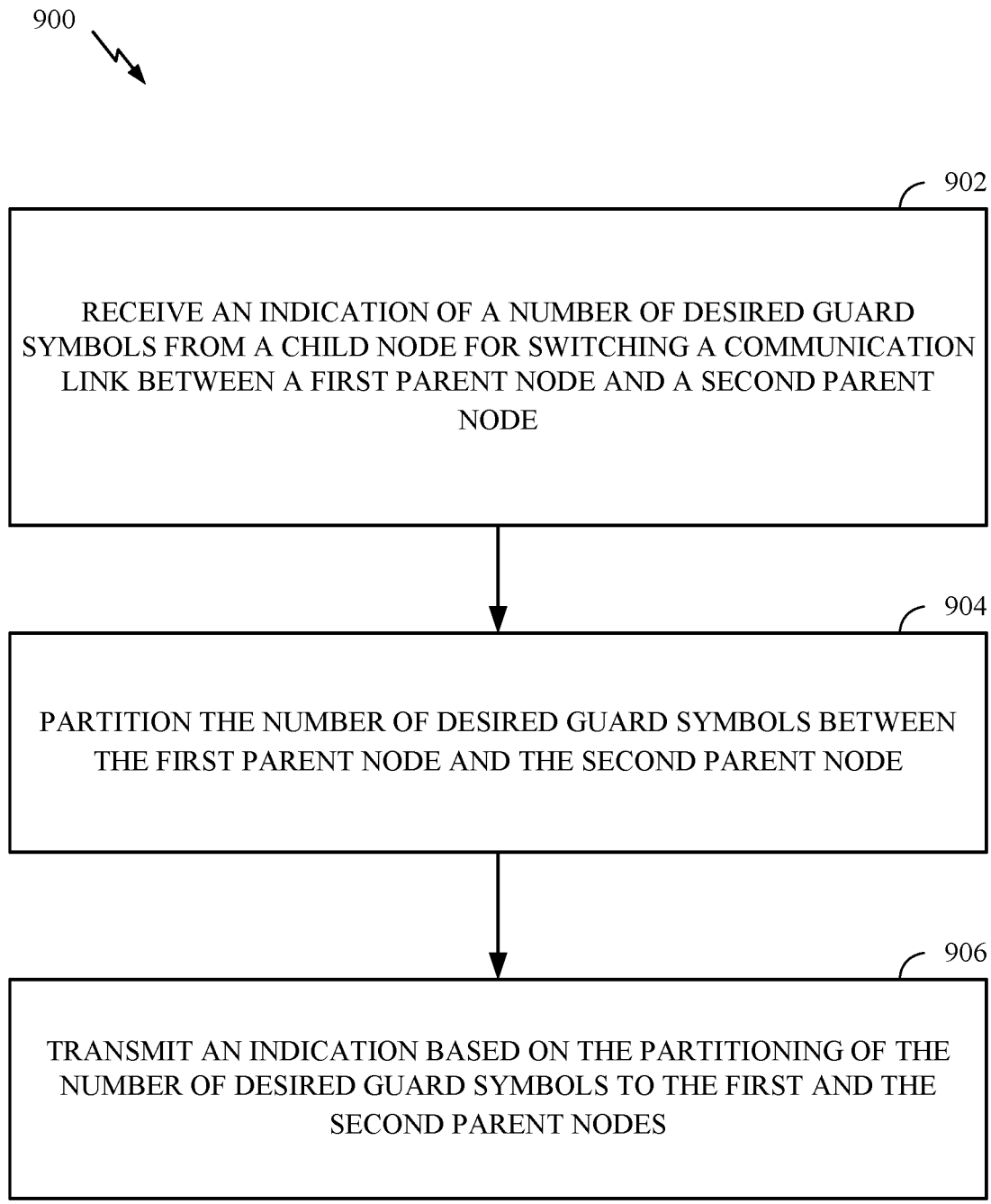
FIG. 9 is a flow diagram illustrating example operations for wireless communication by a central unit (CU) of a network, in accordance with various aspects of the disclosure.
Figure 10:
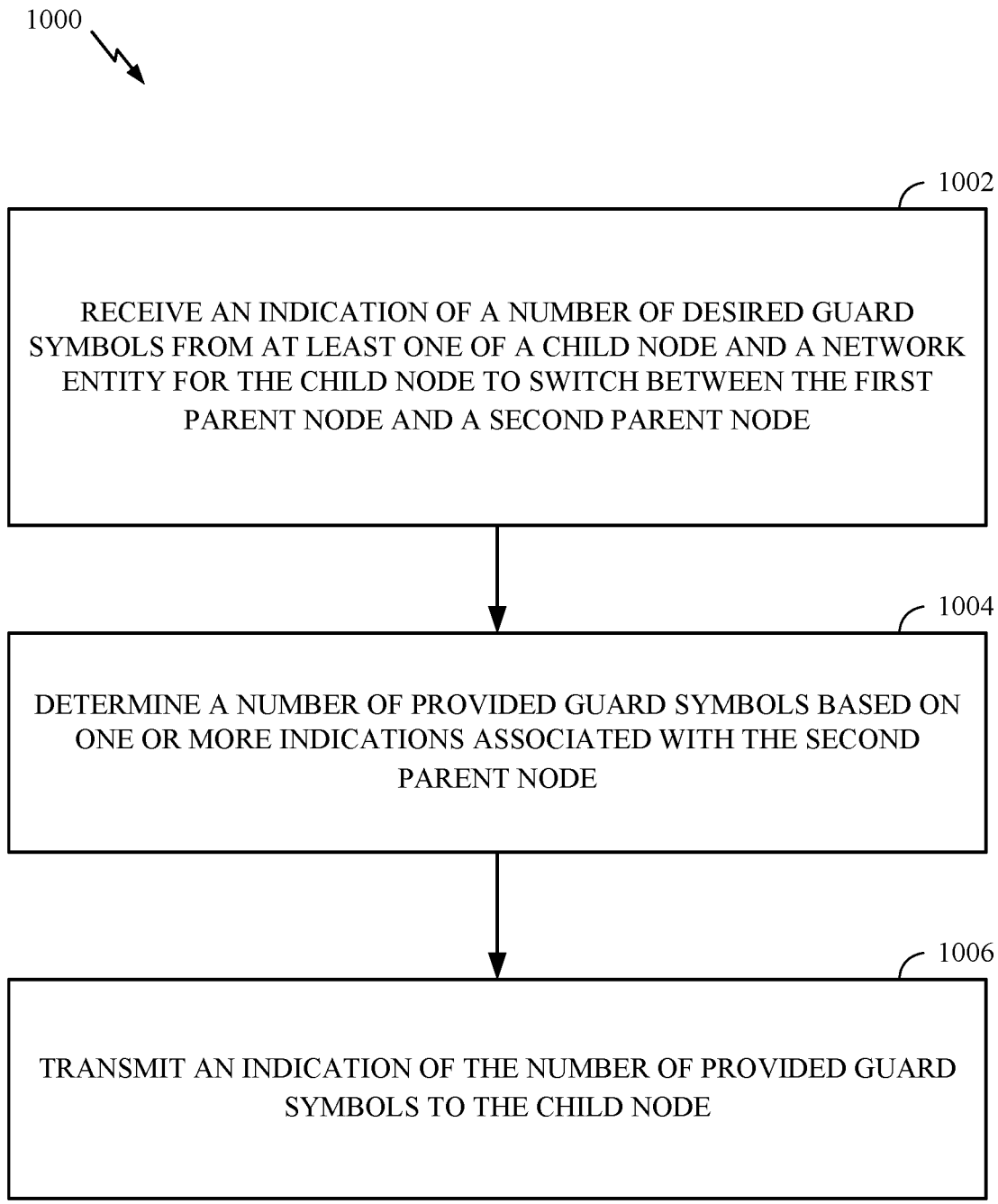
FIG. 10 is a flow diagram illustrating example operations for wireless communication by a parent node of a network, in accordance with certain aspects of the present disclosure.

For example, the wireless communication network 100 may include an IAB-node (implemented as a UE 120 or BS 110) configured to perform operations 800 of FIG. 8, a network entity (e.g., a BS 110) configured to perform operations 1000 of FIG. 10, and/or another network entity configured to perform operations 900 of FIG. 9.

The wireless communication network 100 may be an NR system (e.g., a 5G NR network). As shown in FIG. 1, the wireless communication network 100 may be in communication with a core network 132. The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
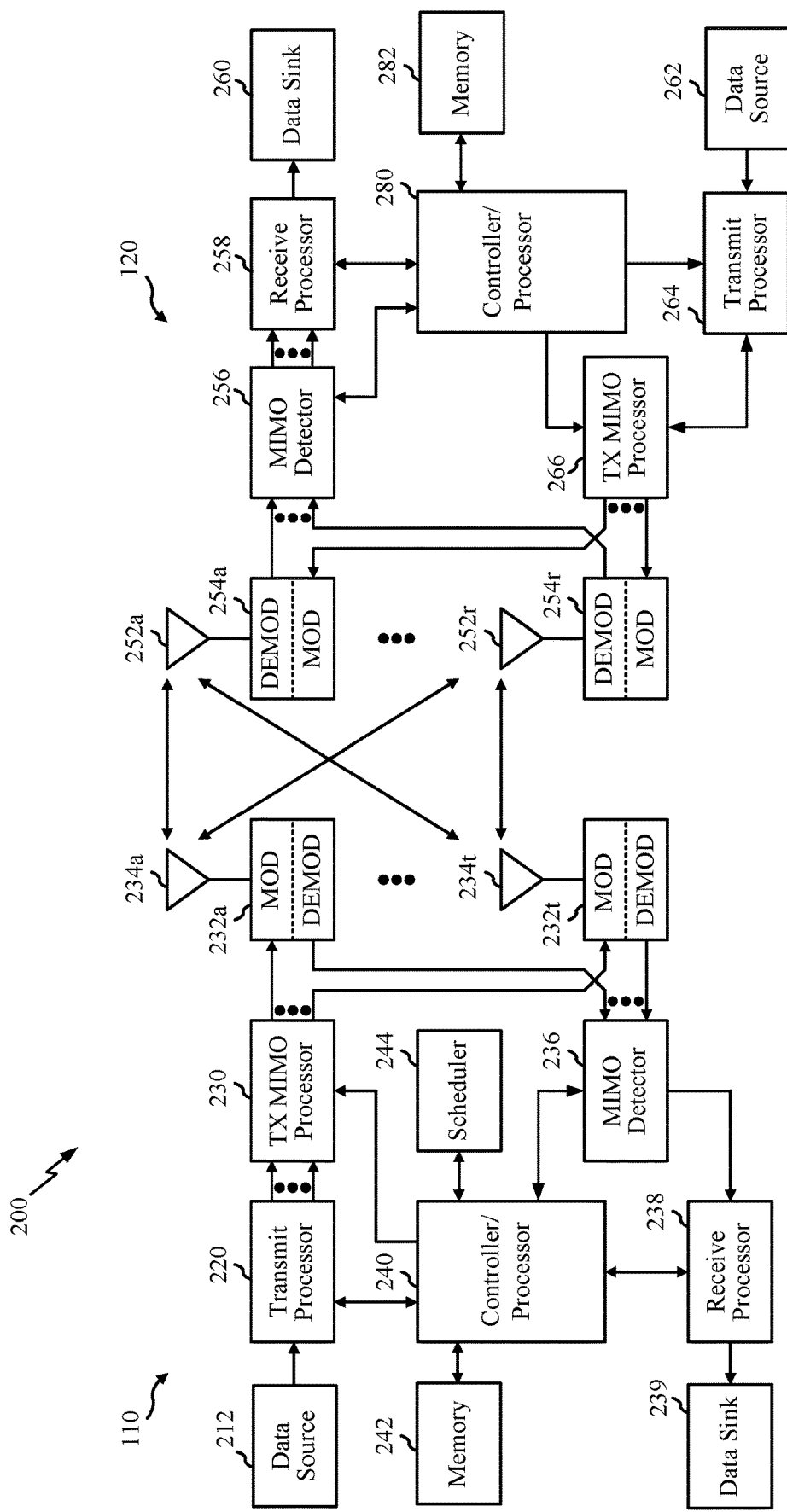
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

It should be noted that though FIG. 2 illustrates UE 120 communicating with a BS 110, a child IAB-node may similar communicate with a parent IAB-node (or other network entity) and each may (e.g., respectively) have similar components as discussed with respect to FIG. 2. In other words, a child IAB-node may have similar components as UE 120 and may be configured to perform operations 800 of FIG. 8, while a parent IAB-node (or other network entity) may have similar components as BS 110 and may be configured to perform operations 900 of FIG. 9 and/or operations 1000 of FIG. 10.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC) control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120a, the antennas 252a-252r may receive the downlink signals from the BS 110a or a parent IAB-node, or a child IAB-node may receive downlink signals from a parent IAB-node, and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120 or a child IAB-node, a transmit processor 264 may receive and process data (e.g., for the physical uplink shared channel (PUSCH) or the PSSCH) from a data source 262 and control information (e.g., for the physical uplink control channel (PUCCH) or the PSCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the base station 110 or a parent IAB-node.

At the BS 110a or a parent IAB-node, the uplink signals from the UE 120 may be received by the antennas 234, processed by the demodulators in transceivers 232a-232t, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data.

Figure 3:
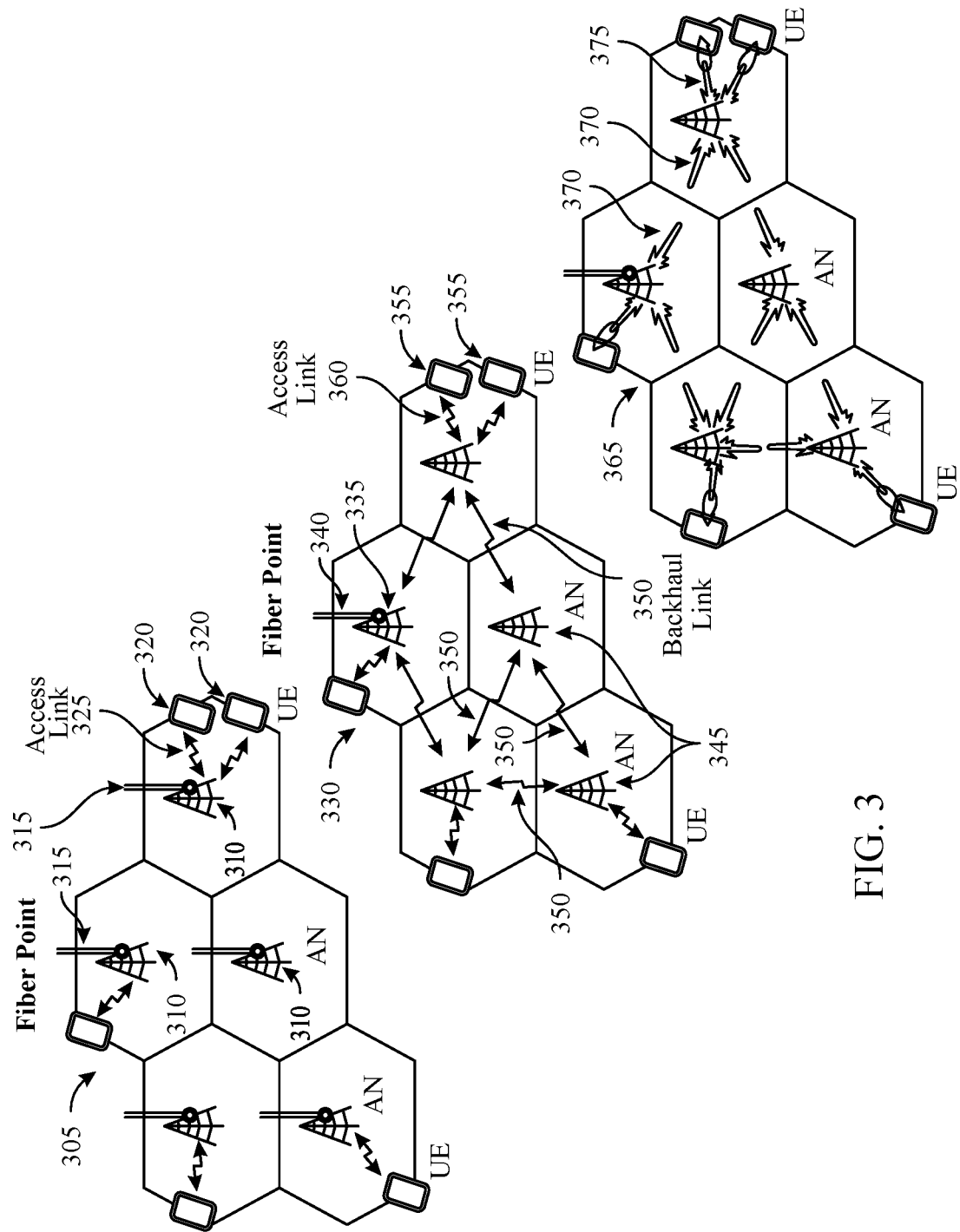
FIG. 3 is a diagram illustrating examples of radio access networks, in accordance with certain aspects of the present disclosure.

FIG. 3 is a diagram illustrating examples of radio access networks, in accordance with various aspects of the disclosure.

As shown by reference number 305, a radio access network (e.g., 3G, 4G, LTE) may include multiple BSs 310 (for example, access nodes (AN)), where each BS 310 communicates with a core network via a wired backhaul link 315, such as a fiber connection. A BS 310 may communicate with a UE 320 via an access link 325, which may be a wireless link. In some aspects, a BS 310 shown in FIG. 3 may correspond to a BS 110a shown in FIG. 1. Similarly, a UE 320 shown in FIG. 3 may correspond to a UE 120a shown in FIG. 1.

As shown by reference number 330, a radio access network may include a wireless backhaul network. In some aspects or scenarios, a wireless backhaul network may sometimes be referred to as an IAB network. An IAB network may include multiple BSs and sometimes the BSs may be of differing types or have differing operational characteristics. For example, in some aspects, an IAB network may have at least one BS that is an anchor BS 335. The anchor BS may communicates with a core network via a wired backhaul link 340, such as a fiber connection. An anchor BS 335 may also be referred to as an IAB donor. Anchor BSs can be configured to communicate with other types of BSs or other communication devices (e.g. in a radio network or IAB network).

The IAB network may also include one or more non-anchor BSs 345. Non-anchor BS may be referred to as relay BSs or IAB nodes. The non-anchor BS 345 may communicate directly with or indirectly with (for example, via one or more other non-anchor BSs 345) the anchor BS 335 via one or more backhaul links 350 to form a backhaul path to the core network for carrying backhaul traffic. Backhaul link 350 may be a wireless link. Anchor BS(s) 335 or non-anchor BS(s) 345 may communicate with one or more UEs 355 via access links 360, which may be wireless links for carrying access traffic. In some aspects, an anchor BS 335 or a non-anchor BS 345 shown in FIG. 3 may correspond to a BS 110 shown in FIG. 1. Similarly, a UE 355 shown in FIG. 3 may correspond to a UE 120 shown in FIG. 1.

As shown by reference number 365, in some aspects, a radio access network that includes an IAB network may utilize a variety of spectrum types. For example, an IAB network may utilize a variety of differing radio frequency bands. In a few particular examples and according to some aspects, millimeter wave technology or directional communications can be utilized (for example, beamforming, precoding) for communications between BSs or UEs (for example, between two BSs, between two UEs, or between a BS and a UE). In additional or alternative aspects or examples, wireless backhaul links 370 between BSs may use millimeter waves to carry information or may be directed toward a target BS using beamforming, precoding. Similarly, the wireless access links 375 between a UE and a BS may use millimeter waves or may be directed toward a target wireless node (for example, a UE or a BS). In this way, inter-link interference may be reduced.

In some aspects, an IAB network may support a multi-hop network or a multi-hop wireless backhaul. Additionally, or alternatively, each node of an IAB network may use the same radio access technology (e.g., 5G/NR). Additionally, or alternatively, nodes of an IAB network may share resources for access links and backhaul links, such as time resources, frequency resources, and spatial resources. Furthermore, various architectures of IAB nodes or IAB donors may be supported.

In some aspects, an IAB donor may include a central unit (CU) that configures IAB nodes that access a core network via the IAB donor and may include a distributed unit (DU) that schedules and communicates with child nodes of the IAB donor.

In some aspects, an IAB node may include a mobile termination component (MT) that is scheduled by and communicates with a DU of a parent node, and may include a DU that schedules and communicates with child nodes of the IAB node. A DU of an IAB node may perform functions described in connection with BS 110 for that IAB node, and an MT of an IAB node may perform functions described in connection with UE 120 for that IAB node.

Figure 4:
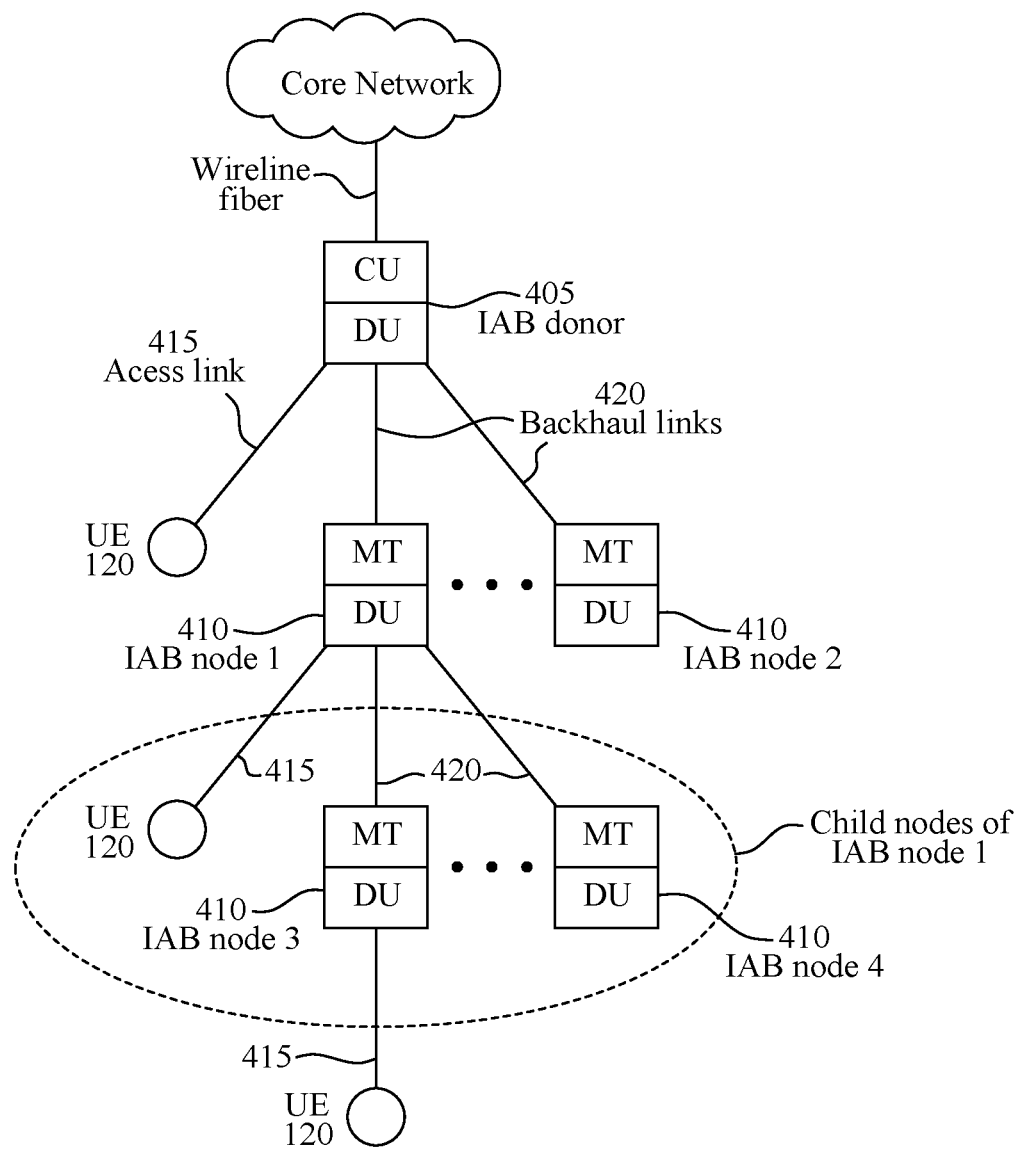
FIG. 4 is a diagram illustrating an example of an integrated access and backhaul (IAB) network architecture in accordance with certain aspects of the present disclosure.

FIG. 4 is a diagram illustrating an example of an IAB network architecture, in accordance with various aspects of the disclosure. As shown in FIG. 4, an IAB network may include an IAB donor 405 that connects to a core network via a wired connection (e.g., as a wireline fiber). For example, an NG interface of an IAB donor 405 may terminate at a core network. Additionally, or alternatively, an IAB donor 405 may connect to one or more devices of the core network that provide a core access and mobility management function (AMF). In some aspects, an IAB donor 405 may include a BS 110, such as an anchor BS, as described above in connection with FIG. 3. As shown, an IAB donor 405 may include a CU, which may perform ANC functions or AMF functions. The CU may configure a DU of the IAB donor 405 or may configure one or more IAB nodes 410 (for example, an MT or a DU of an IAB node 410) that connect to the core network via the IAB donor 405. Thus, a CU of an IAB donor 405 may control or configure the entire IAB network that connects to the core network via the IAB donor 405, such as by using control messages or configuration messages (for example, a radio resource control (RRC) configuration message, an F1 Application Protocol (F1-AP) message).

As described above, the IAB network may include IAB nodes 410 (shown as IAB nodes 1 through 4) that connect to the core network via the IAB donor 405. As shown, an IAB node 410 may include an MT and may include a DU. The MT of an IAB node 410 (for example, a child node) may be controlled or scheduled by another IAB node 410 (for example, a parent node) or by an IAB donor 405. The DU of an IAB node 410 (for example, a parent node) may control or schedule other IAB nodes 410 (for example, child nodes of the parent node) or UEs 120. Thus, a DU may be referred to as a scheduling node or a scheduling component, and an MT may be referred to as a scheduled node or a scheduled component. In some aspects, an IAB donor 405 may include a DU and not an MT. That is, an IAB donor 405 may configure, control, or schedule communications of IAB nodes 410 or UEs 120. A UE 120 may include only an MT, and not a DU. That is, communications of a UE 120 may be controlled or scheduled by an IAB donor 405 or an IAB node 410 (for example, a parent node of the UE 120).

According to some aspects, certain nodes may be configured to participate in control/scheduling processes. For example in some aspects, when a first node controls or schedules communications for a second node (for example, when the first node provides DU functions for the second node's MT), the first node may be referred to as a parent node of the second node, and the second node may be referred to as a child node of the first node. A child node of the second node may be referred to as a grandchild node of the first node. Thus, a DU of a parent node may control or schedule communications for child nodes of the parent node. A parent node may be an IAB donor 405 or an IAB node 410, and a child node may be an IAB node 410 or a UE 120. Communications of an MT of a child node may be controlled or scheduled by a parent node of the child node.

As further shown in FIG. 4, a link between a UE 120 and an IAB donor 405, or between a UE 120 and an IAB node 410, may be referred to as an access link 415. Each access link 415 may be a wireless access link that provides a UE 120 with radio access to a core network via the IAB donor 405, and potentially via one or more IAB nodes 410.

As further shown in FIG. 4, a link between an IAB donor 405 and an IAB node 410, or between two IAB nodes 410, may be referred to as a backhaul link 420. Each backhaul link 420 may be a wireless backhaul link that provides an IAB node 410 with radio access to a core network via the IAB donor 405, and potentially via one or more other intermediate IAB nodes 410. In some aspects, a backhaul link 420 may be a primary backhaul link or a secondary backhaul link (for example, a backup backhaul link). In some aspects, a secondary backhaul link may be used if a primary backhaul link fails, becomes congested, or becomes overloaded. In an IAB network, network resources for wireless communications (for example, time resources, frequency resources, spatial resources) may be shared between access links 415 and backhaul links 420.

As described above, in a typical IAB network, IAB nodes (for example, non-anchor BSs) are stationary (i.e., non-moving). Next generation (e.g., 5G) wireless networks have stated objectives to provide ultra-high data rate and support wide scope of application scenarios. IAB systems have been studied in 3GPP as one possible solution to help support these objectives.

As noted above, in IAB, a wireless backhaul solution is adopted to connect cells (IAB-nodes) to the core network (which uses a wired backhaul). Some attractive characteristics of IAB are support for multi-hop wireless backhaul, sharing of the same technology (e.g., 5G NR) and resources (e.g., frequency bands) for both access and backhaul links.

There are various possible architectures for IAB-nodes, including layer-2 (L2) and layer-3 (L3) solutions and a particular architecture deployed may depend on what layers of protocol stack are implemented in the intermediate nodes (IAB-nodes), for example, L2 relays may implement physical (PHY), medium access control (MAC), and/or radio link control (RLC) layers.

Figure 5:
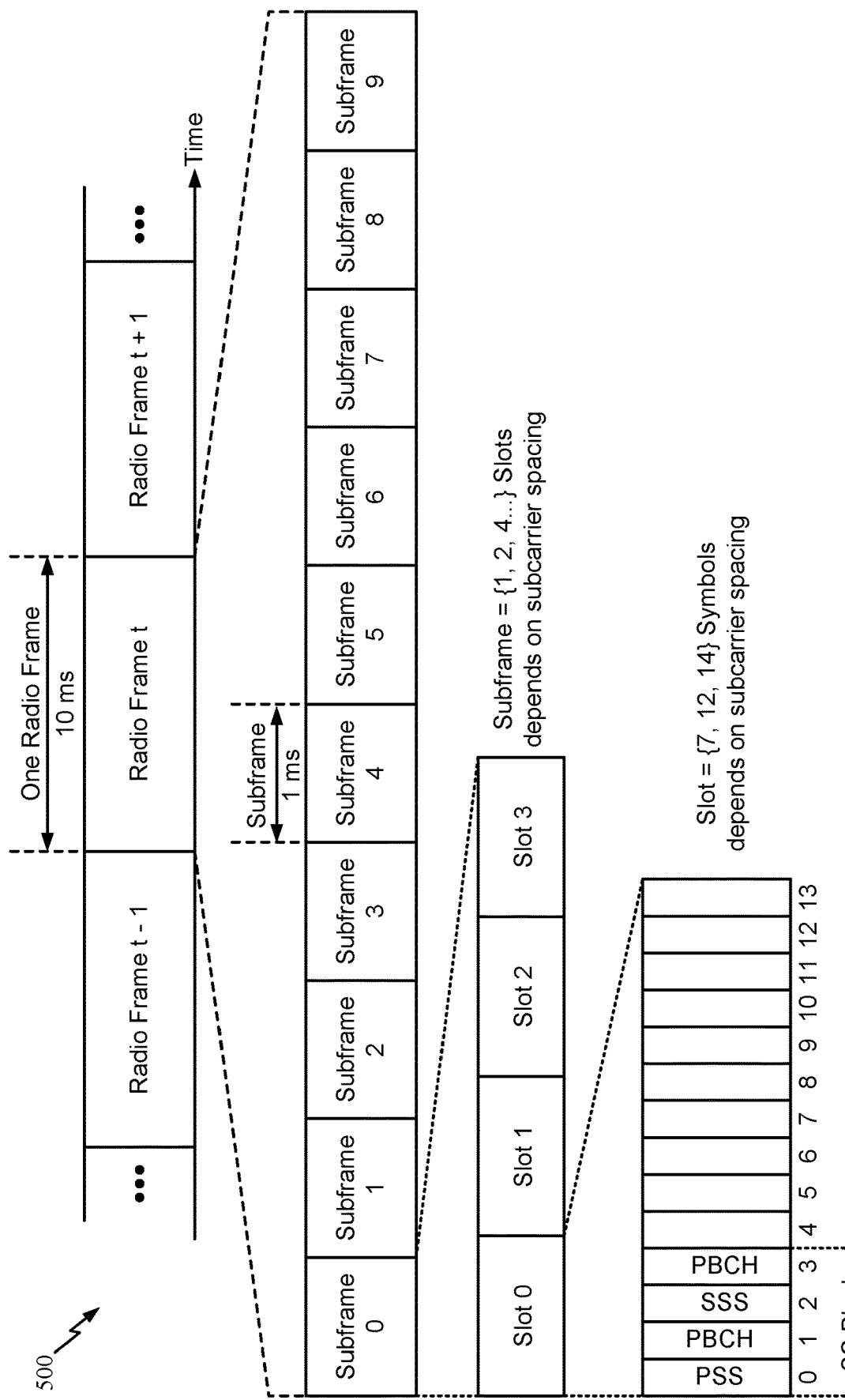
FIG. 5 is an example frame format for certain wireless communication systems (e.g., new radio (NR)), in accordance with certain aspects of the present disclosure.

FIG. 5 is a diagram showing an example of a frame format 500 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 5. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

Example Gap Switch for a Wireless System with Multiple Parents

Aspects of the present disclosure provide techniques for switching a communication link in a wireless network with multiple parents, such as an Integrated Access and Backhaul (IAB) network.

Generally, in an IAB network, a node may operate according to both mobile termination component (MT) functions and distributed unit (DU) functions and, depending on the nodes capability, may only be able to operate according to one at a time. As such the node may need to transition between the MT functions and the DU functions.

Figure 6:
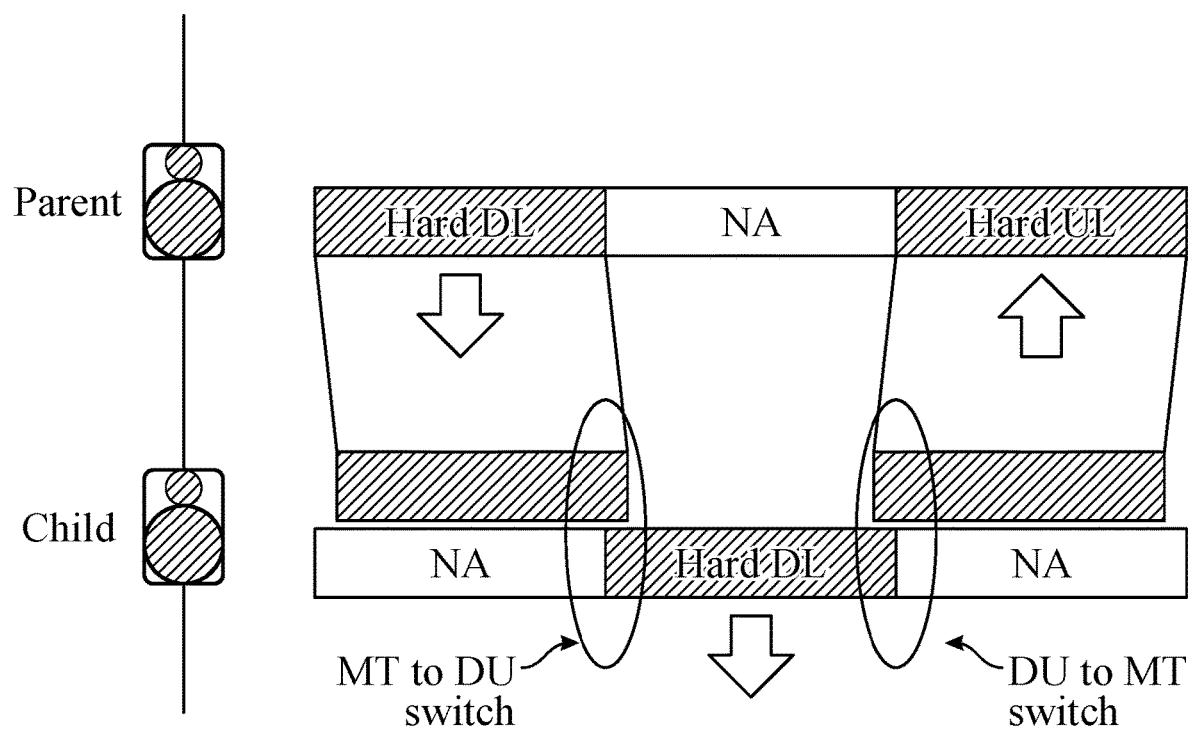
FIG. 6 illustrates example transitions between a parent node and a child node, in accordance with certain aspects of the present disclosure.

FIG. 6 illustrates a child node performing MT functions and DU functions. MT functions may include receiving a downlink transmission from its parent or sending an uplink transmission to its parent. DU functions may include sending to or receiving from the child node's own child. As illustrated in circles in FIG. 6, the child node may need to transition between MT and DU functions depending on a scheduling configuration. A switching gap is a guard period to allow the child node to transition between MT and DU. The switching gap may require guard symbols due to a requirement for component switch (e.g. switch between transmit (TX) and receive (RX), analog beam switch). Guard symbols may also be needed to avoid or minimize resource overlapping conflicts between MT and DU due to propagation latency or timing advance.

Figures 7A, 7B:
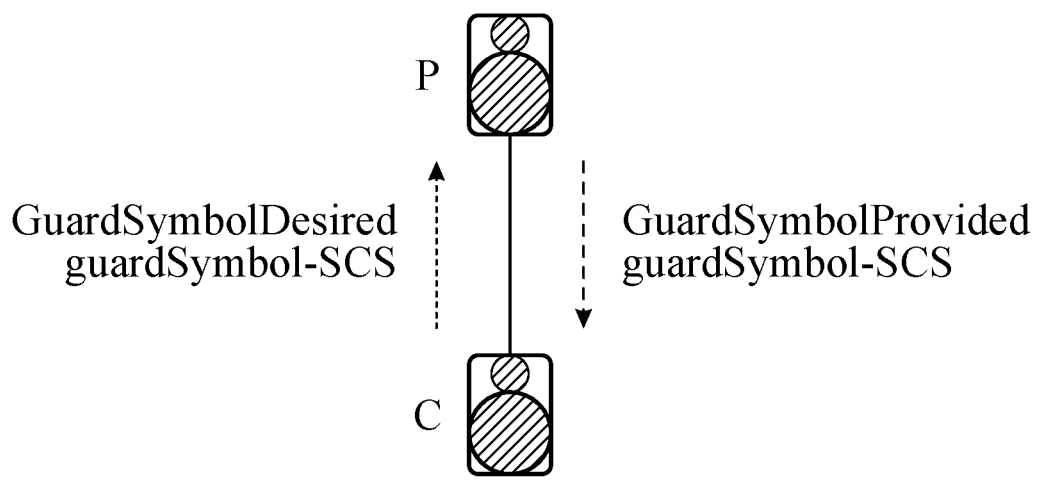
FIG. 7A-B illustrates example switch types and indications for transitions between a parent node and a child node, in accordance with certain aspects of the present disclosure.

FIG. 7A illustrates a table of various switch types for transitions for a node. Generally, eight switch types for transitions between MT and DU are defined. For example, one switch type may be for a node to transition from its MT downlink receive functionality to its DU downlink transmit functionality or its DU uplink receive functionality. FIG. 7A thus shows the types of switches for MT-to-DU and DU-to-MT transitions.

FIG. 7B shows guard symbol indications sent between a parent node (P) and a child node (C) to facilitate transitions. A child node sends an indication of a number of guard symbols desired (GuardSymbolDesired), which may depend on the subcarrier spacing (SCS) used on the link between the child node to the parent node (symbol periods are generally inversely proportional to SCS). In response, a parent node sends an indication of a number of guard symbols provided (GuardSymbolProvided). In some cases, nodes send these guard symbol indications via medium access control (MAC) control elements (MAC-CEs). These indications help to determine the number of guard symbols for each switch type defined in FIG. 7A.

Generally, the number of guard symbols desired by the child node is less than the number of guard symbols provided by the parent node. In this case, the child node may need to avoid or resolve the potential conflict.

In some cases, the exchange of guard symbol indications may be extended to networks with multiple parents for a child node. The multiple parents may operate at a same frequency band, with time division multiplexing (TDM) resource allocation between different parents. Guard symbols may be required for a child node to switch its communication from one parent node to another parent node. Guard symbols help avoid or minimize resource overlapping conflicts between parent nodes due to different parameter values from different parents such as synchronization timing, propagation latency, and timing advance. Guard symbols help accommodate for the time required for component switch (e.g. switch between TX and RX, analog beam switch). Also, guard symbols may accommodate for time required for power changes. For example, a node may take some time to ramp up transmit power to a desired level when switching. In another example, a node may take some time to adapt low noise amplifier (LNA) configurations for different receive power levels at different links.

Aspects of the present disclosure provide techniques for switching a communication link for wireless systems with multiple parents. While the techniques presented herein are described with reference to IAB networks and corresponding nodes, the techniques may be more generally applied to any type of wireless node (e.g., generally to user equipments (UEs) and base stations (BSs)).

FIG. 8 is a flow diagram illustrating example operations 800 for wireless communication by a child node (e.g., of an IAB network), in accordance with certain aspects of the present disclosure. Operations 800 may be implemented as software components that are executed and run on one or more processors (e.g., controller/processor 240 of FIG. 2). Further, the transmission and reception of signals by the first wireless communication device in operations 800 may be enabled, for example, by one or more antennas (e.g., antennas 234 of FIG. 2). In certain aspects, the transmission and/or reception of signals by the first wireless communication device may be implemented via a bus interface of one or more processors (e.g., controller/processor 230, 220, 238, 240, and 244) obtaining and/or outputting signals.

Operations 800 may begin, at 802, by determining a partition of a number of desired guard symbols between a first parent node and a second parent node. At 804, the child node sends, to the first parent node and to the second parent node, at least one indication of a partitioned number of the desired guard symbols for switching between the first parent node and the second parent node. At 806, the child node receives at least one indication of a number of provided guard symbols from the first and second parent nodes. At 808, the child node switches a communication link from the first parent node to the second parent node in accordance with the at least one indication of provided guard symbols by the first parent node and the second parent node.

FIG. 9 is a flow diagram illustrating example operations 900 for wireless communication by a CU (e.g., of an IAB network), in accordance with certain aspects of the present disclosure. Operations 900 may be implemented as software components that are executed and run on one or more processors (e.g., controller/processor 280 of FIG. 2). Further, the transmission and reception of signals by the first wireless communication device in operations 900 may be enabled, for example, by one or more antennas (e.g., antennas 252 of FIG. 2). In certain aspects, the transmission and/or reception of signals by the first wireless communication device may be implemented via a bus interface of one or more processors (e.g., controller/processor 258, 264, 266, and/or 280) obtaining and/or outputting signals.

Operations 900 begin, at 902, by receiving an indication of a number of desired guard symbols from a child node for switching a communication link between a first parent node and a second parent node. At 904, the CU partitions the number of desired guard symbols between the first parent node and the second parent node. At 906, the CU transmits an indication based on the partitioning of the number of desired guard symbols to the first and the second parent nodes.

FIG. 10 is a flow diagram illustrating example operations 1000 for wireless communication by a parent node (e.g., of an IAB network), in accordance with certain aspects of the present disclosure. Operations 1000 may be implemented as software components that are executed and run on one or more processors (e.g., controller/processor 280 of FIG. 2). Further, the transmission and reception of signals by the first wireless communication device in operations 1000 may be enabled, for example, by one or more antennas (e.g., antennas 252 of FIG. 2). In certain aspects, the transmission and/or reception of signals by the first wireless communication device may be implemented via a bus interface of one or more processors (e.g., controller/processor 258, 264, 266, and/or 280) obtaining and/or outputting signals.

Operations 1000 begin, at 1002, by receiving at least one indication of a number of the desired guard symbols from at least one of a child node and a network entity for the child node to switch between the first parent node and a second parent node. At 1004, the parent node determines a number of provided guard symbols based on one or more indications associated with the second parent node. At 1006, the parent node transmits an indication of the number of provided guard symbols to the child node.

Aspects of the present disclosure apply to transitions for a child node when the child node communicates with different parent nodes. In some aspects, switch types are defined for a child node when switching between a first parent node (P1) and a second parent node (P2).

Figures 11A, 11B:
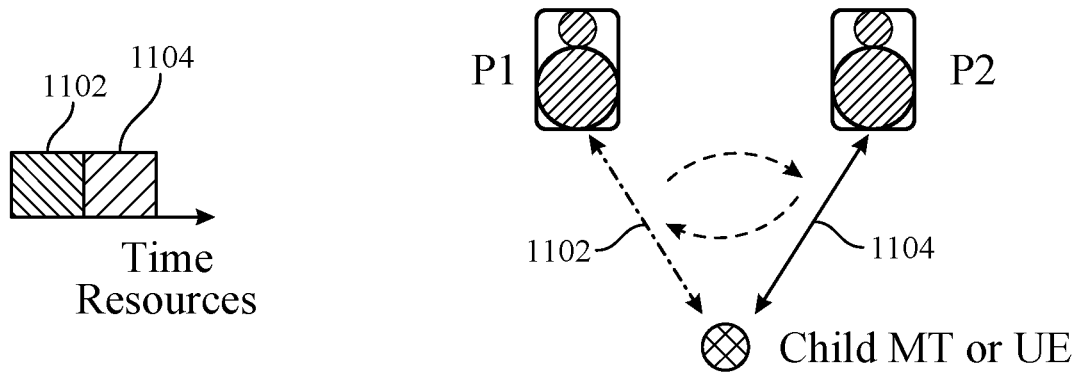
FIG. 11A illustrates example time resources for communication between parent nodes and a child node, in accordance with certain aspects of the present disclosure.
FIG. 11B illustrates example switch types for parent nodes, in accordance with certain aspects of the present disclosure.

FIG. 11A illustrates example communications between a child node and two parent nodes P1 and P2 and potential switches (switch types) by the child node between P1 and P2. As illustrated, the child node (child MT or UE) use different time resources for communicating between parent nodes P1 and P2: the child node uses time resources 1102 for communicating with parent node P1 time resources 1104 for communicating with parent node P2. In some cases, switch types may be defined for any pair of parent nodes. For example, switch types may be defined for switches among three parent nodes (P1, P2, P3): between P1 and P2, between P1 and P3, and between P2 and P3. In such cases where a child node switches between multiple parents, the child node needs to identify a switch instance and the switch type. The guard symbols for a switch instance may be divided between two parent nodes, and so the parent nodes need to be coordinated to determine its share of guard symbols.

FIG. 11B illustrates example switch types for switching between parent nodes and a child node, in accordance with certain aspects of the present disclosure. A parent node may not have full information about other patent nodes to determine an exact switch type as listed in FIG. 11B at each switch location. For example, a parent node may not have time division duplexing (TDD) configuration of another parent node. In such cases, the parent node may only be able to identify a switch location between P1 and P2 but not exact switch type with detailed downlink and/or uplink direction. In another example, a parent node (e.g., P1) may not have dynamic scheduling information of another parent node (e.g., P2) to determine whether flexible symbols should be downlink or uplink at another parent node (e.g., P2). Accordingly, extended switch types for parent nodes besides regular switch types may be defined.

Figure 12:
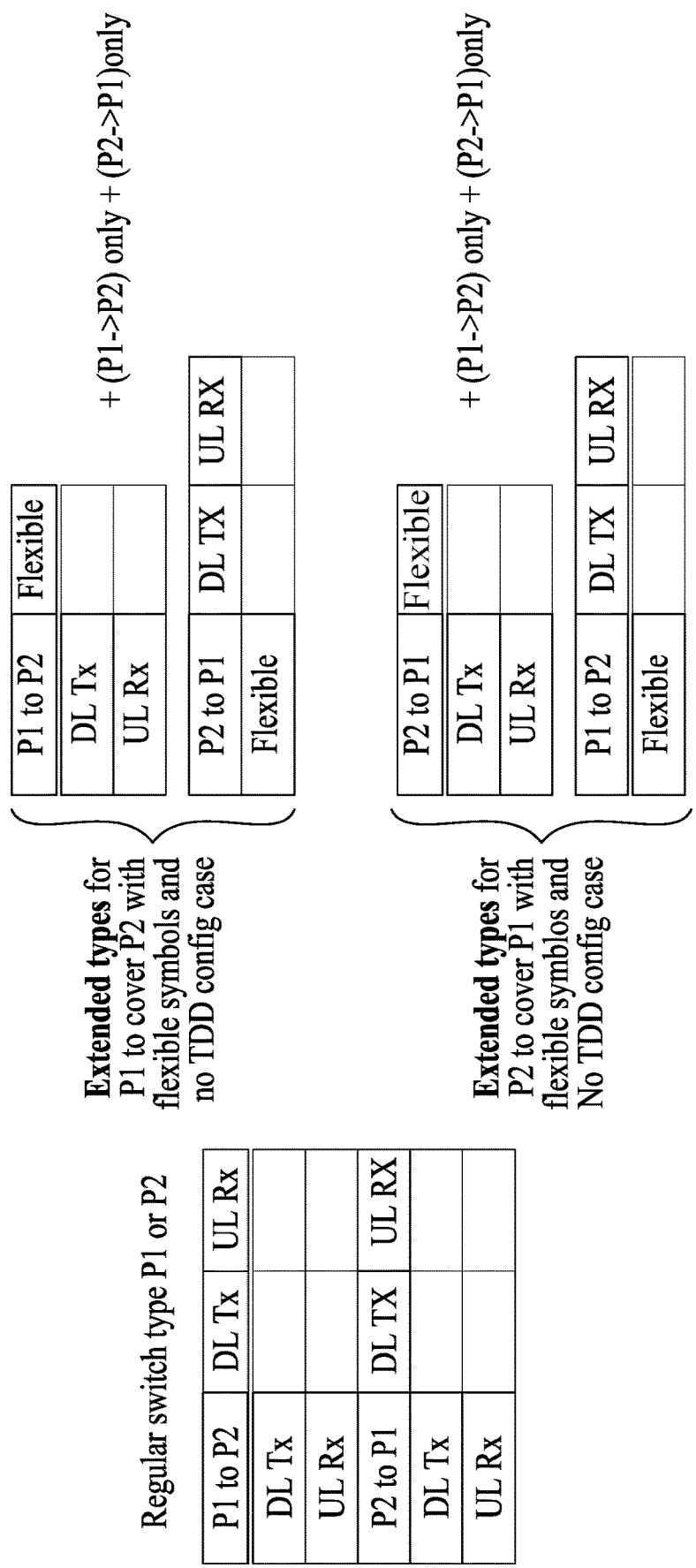
FIG. 12 illustrates example extended switch types for parent nodes, in accordance with certain aspects of the present disclosure.

FIG. 12 illustrates regular and extended switch types for a child node between two parents. The extended switch types are defined for P1 to cover P2 with flexible symbols where P1 does not have the TDD configuration of P2, and for P2 to cover P1 with flexible symbols where P2 does not have the TDD configuration of P1.

In some aspects, a parent node may identify a potential switch instance and switch type of a child node. In some aspects, a parent node (e.g., P1) may be provided with configuration of another parent node (e.g., P2). The configuration may be a semi-static configuration of "Hard/Soft/Not Available" resources and/or a TDD configuration. In some cases, the parent node receives Layer 1 (L1) scheduling information, such as slot format indication (SFI), availability indication (AI) of soft resources and/or even a scheduling plan, if available. Depending on available information at a parent node, the parent node may identify a regular switch type or an extended switch type for a switch instance.

In some aspects, a parent node may be provided with an indication of potential switch locations for applying guard symbols. The indication may take different formats (e.g., a bitmap, a set of resource indices). The indication may carry additional information, such as a switch type at each switch instance. The switch type may be a regular or extended switch type depending on available information when the indication is generated. For example, some symbols may be a flexible type when the indication is generated for a set of symbols.

A child node may coordinate the sharing of guard symbols between parent nodes. For example, the child node may report a number of desired guard symbols to each parent node respectively, and receive provided guard symbols from each parent node respectively. In some cases, the child node may partition desired guard symbols among two parents, and report each split value as desired guard symbols to the corresponding parent node. In some cases, the child node may first report desired guard symbols to a first parent node (e.g., P1), and then determine desired guard symbols to the second parent node (e.g., P2) based on the number of provided guard symbols received from the first parent node. In other words, the child node may determine the number of desired guard symbols for the second parent node only after learning the number of guard symbols provided by the first parent node (e.g., and may ask for the remaining number of desired guard symbols).

Figures 13A, 13B, 13C:
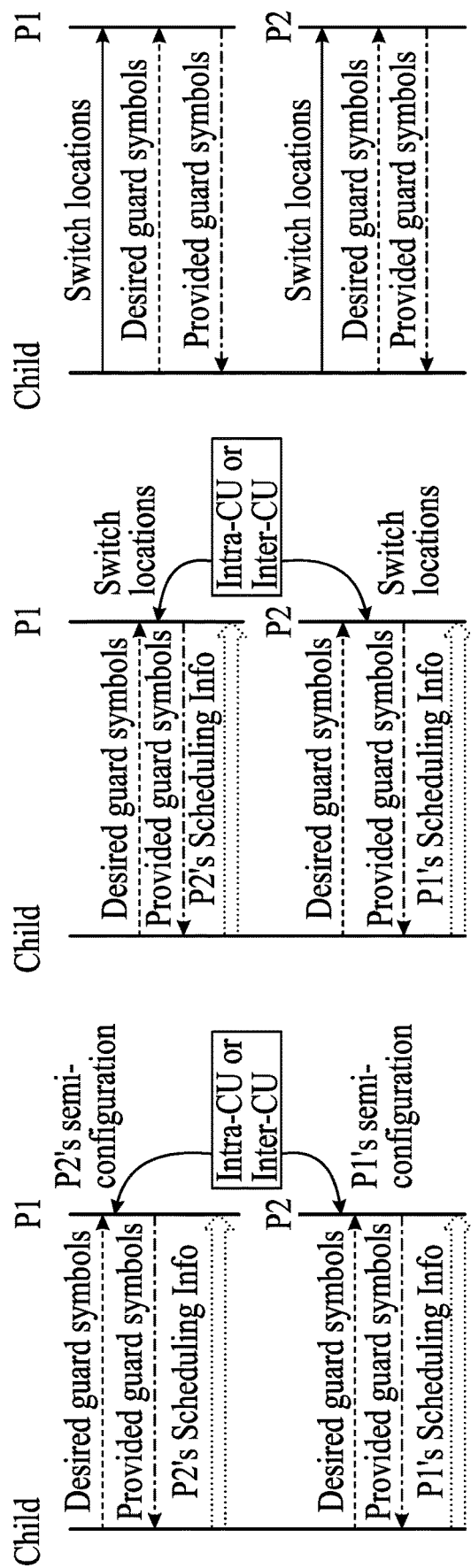
FIG. 13A-C illustrates example cases with coordination by a child node, in accordance with certain aspects of the present disclosure.

FIGS. 13A-C illustrates example call flows between a child node and parent nodes before the child node switches from one parent node to the other parent node. Each of the call flows illustrate the child node reporting a number of desired guard symbols to P1 and P2, and the parent nodes each responding with a number of provided guard symbols. In FIGS. 13A and 13B, the child node also sends to the parent node the scheduling information of the other parent node (i.e., P2's scheduling information to P1 and P1's scheduling information to P2). Also, the parent nodes may receive an indication of the configuration of the parent node in FIG. 13A, or the parent nodes may receive an indication of switch locations in FIG. 13B. In some cases, these indication may be provided to the parent node via the CU or the child node. In some cases, these indication may be provided via coordination between multiple CUs. In FIG. 13C, the child node sends the indication of switch locations before sending the indications of the desired guard symbols to each parent node.

After determining the guard symbols provided by the parent nodes for a switching gap, per the call flows of FIGS. 13A-C, the child node performs a switch between P1 and P2, as the parent nodes have the information to identify the switch instance and the switch type of the child node. If the number of provided guard symbols added from both parent nodes is smaller than the total number of desired guard symbols of child node, the child node may resolve potential conflict due to overlapped resources. For example, a child node may need to choose one parent node (e.g., P1) to communicate with at overlapped resources, and discard communication with another parent node (e.g., P2).

A CU may also coordinate the sharing of guard symbols between parent nodes. A child node may report a number of desired guard symbols to the CU. In some cases, the CU partitions the number of desired guard symbols among two parent nodes, and sends a number of provided guard symbols based on the partition of desired guard symbols for each of two parent nodes. Accordingly, the CU dictates the number of provided guard symbols for each parent node and the parent nodes abide by the dictated numbers. In some cases, the CU partitions the number of desired guard symbols among two parent nodes, and sends partitioned numbers of desired guard symbols for each of two parent nodes. In these cases, upon receiving the number of desired guard symbols based on the partition, each parent node sends a number of provided guard symbols to the child node and/or CU. Accordingly, in these cases, the parent nodes may determine a number of provided guard symbols based on the partitioned desired guard symbols without the CU dictating the number. In some cases, two parents belong to different CUs and thus inter-CU coordination is required.

Figures 14A, 14B, 14C:
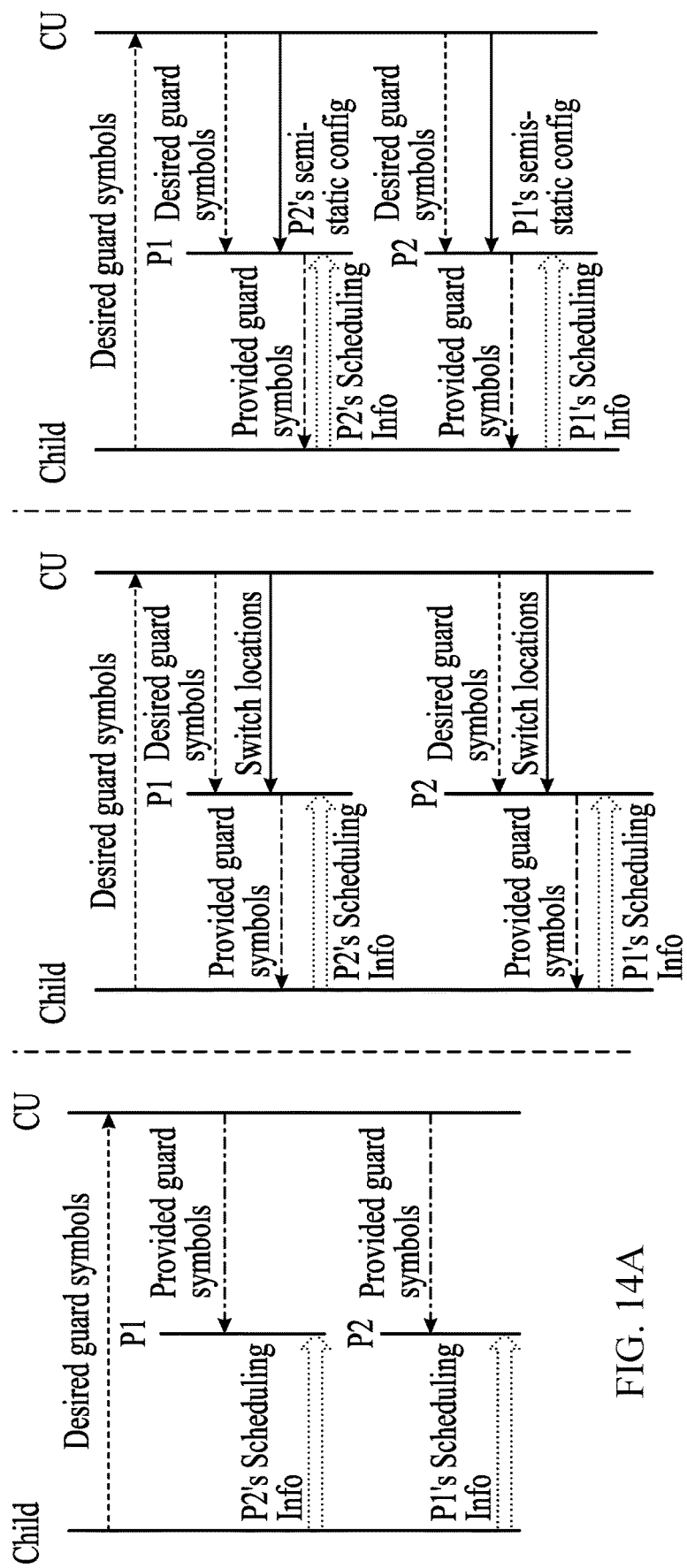
FIG. 14A-C illustrates examples with coordination by a network entity, in accordance with certain aspects of the present disclosure.

FIGS. 14A-C illustrate example call flows where the CU coordinates the sharing of guard symbols. Each of the call flows illustrate the child node reporting a number of desired guard symbols to the CU. In FIG. 14A, the CU partitions the number of number of desired guard symbols amongst the two parent nodes (P1 and P2), and sends a corresponding number of provided guard symbols to P1 and P2. In FIGS. 14B and 14C, the CU partitions the number of desired guard symbols and sends the partitioned number of desired guard symbols to P1 and P2. The CU may also send switch locations (in FIG. 14B) or the configuration of another parent node (in FIG. 14C). Upon receiving the partitioned number of desired guard symbols and either the indication of switch locations or the configuration of another parent node, the parent nodes send a number of provided guard symbols to the child node based on the partitioned number of desired guard symbols. In each case, the child node may also send to the parent node scheduling information corresponding to the other parent node (i.e., P2's scheduling information to P1 and P1's scheduling information to P2).

After determining the guard symbols provided by the parent nodes for a switching gap, per the call flows of FIG. 14A-C, the child node performs a switch between P1 and P2, and the parent nodes has the information to identify the switch instance and the switch type of the child node.

In some cases, the indication of desired guard symbols includes a number of desired guard symbols over all or a subset of the switch cases (types), illustrated in FIG. 11. The indication of desired guard symbols may also include subcarrier spacing for the desired guard symbols. The indication of desired guard symbols may be provided via a medium access control (MAC) control element (MAC-CE) from a child node to parent nodes, a radio resource control (RRC) message from the child node to the CU, or an F1 Application Protocol (F1-AP) message from the CU to the parent node.

In some aspects, the indication of provided guard symbols includes the number of guard symbols provided by a parent node over a set of switch types. The indication of provided guard symbols may include subcarrier spacing for the provided guard symbols. In some cases, the numbers of guard symbols are provided for both regular and extended switch types in a signaling message. In some cases, the numbers of guard symbols are provided for regular switch types in signaling messages, and values for extended switch types are derived from regular switch types based on definitions in a specification or on RRC configured rules. For example, for an extended switch type where a node switches from parent node P1 (DL or UL) to parent node P2 (Flexible), the provided guard symbols may be either the maximum or minimum value between the switch from P1 (DL or UL) to P2 (DL) and the switch from P1 (DL or UL) to P2 (UL), or there are no provided guard symbols. In another example, for an extended switch type from P1 to P2, the provided guard symbols may be either the maximum or minimum value among the four regular switch types with DL/UL associated with the switch from P1 to P2, or there are no provided guard symbols. In some cases, the indication of provided guard symbols may include an indication of switch locations for applying guard symbols (e.g. via a bitmap, or a set of resource indices). The indication of provided guard symbols may be provided via a MAC-CE from the parent node to the child node, or an F1-AP from the CU to the parent node.

As noted above, scheduling information for one parent (e.g., P1) may be provided to another parent (e.g., P2). The scheduling information may include the parent node's SFI, AI, and/or scheduling plan if supported. The scheduling information of the parent node may be provided via a L1-signaling message via physical uplink control channel (PUCCH) or physical uplink shared channel (PUSCH) from the child node to another parent node, or via an uplink MAC-CE from the child node to the other parent node. According to some examples, the parent node may determine the actual switch instance more accurately with scheduling information to apply proper guard symbols.

In some aspects, the configuration of one parent node may be provided to another parent node. The configuration may include semi-static configuration of "Hard/Soft/Not Available" resources and/or semi-static TDD configuration of the parent node. The configuration may be in an F1-AP message from the CU to the other parent node, or in an Xn message between CUs if the parents belong to different CUs.

As noted above, an indication of switch locations may be provided to the parent node. The indication may include an indication of switch locations for applying guard symbols. In some cases, the indication includes the switch type at each switch location. The switch type may be a regular switch type or extended switch type depending on available information when the indication is generated. For example, some symbols may be a flexible type when the indication is generated for a set of symbols. The indication of switch locations may be included in an F1-AP message from the CU to a parent node, or may be a MAC-CE from the child node to a parent node.

The disclosed techniques may be applied to multi-MTs, where each parent is connected to one virtual MT, to multiple transmission reception points (TRPs) of same parent, and to multiple TRPs of an MT. The disclosed techniques may apply for any pair of parent nodes in a child has more than two parent nodes. The disclosed techniques may also be used for IAB networks as well as access network with intra-band or intra-frequency multi-parents.

Figure 15:
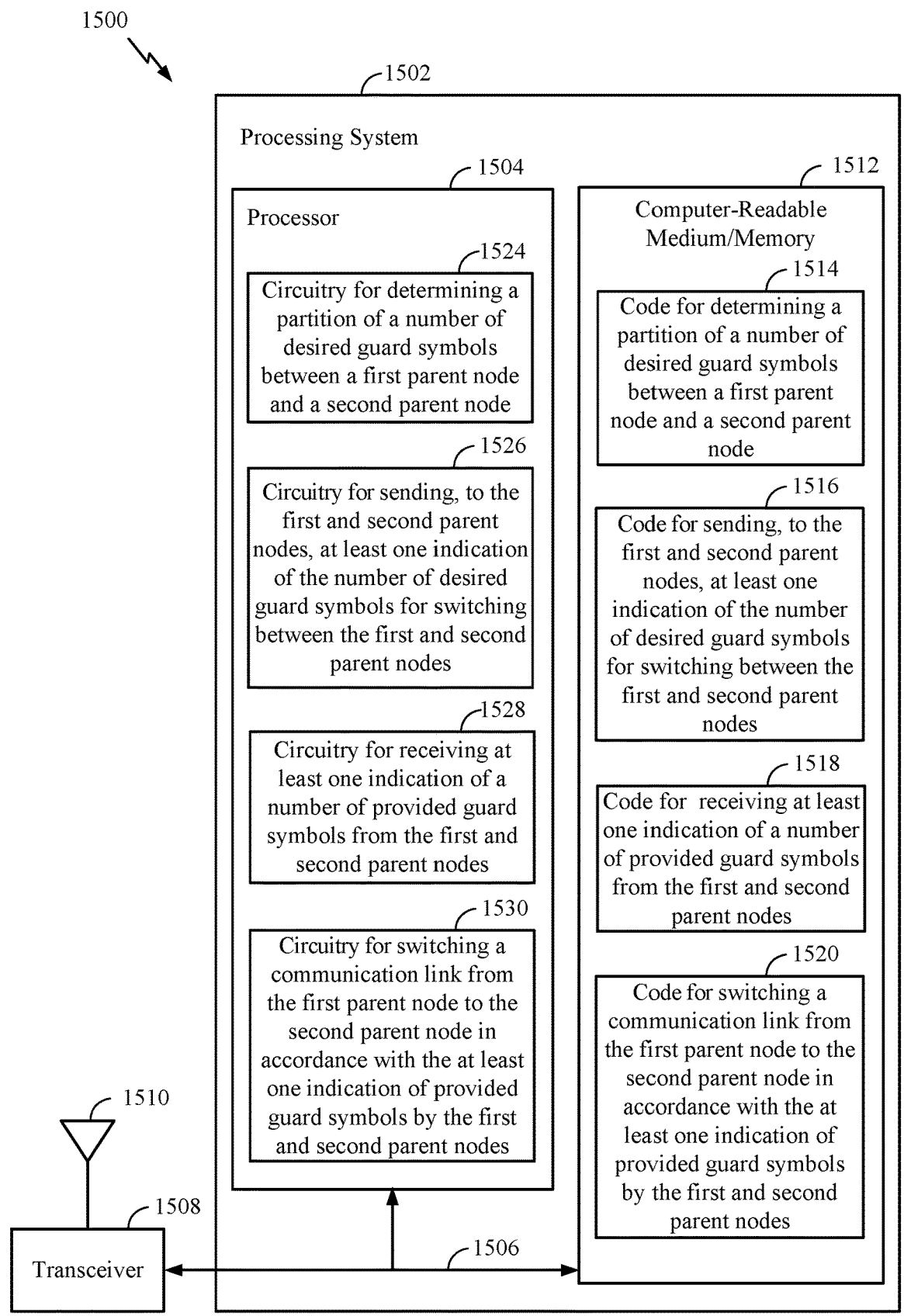
FIG. 15 illustrates a communications device that may include various components configured to perform operations for the techniques disclosed herein in accordance with certain aspects of the present disclosure.

FIG. 15 illustrates a communications device 1500 that may include various components (e.g., corresponding to means-plus-function components) configured to perform operations for the techniques disclosed herein, such as the operations illustrated in FIG. 8. The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 8, or other operations for performing the various techniques discussed herein for switching a communication link for wireless systems with multiple parents, such as an IAB network. In certain aspects, computer-readable medium/memory 1512 stores code 1514 for determining a partition of a number of desired guard symbols between a first parent node and a second parent node; code 1516 for sending, to the first parent node and to the second parent node, at least one indication of a partitioned number of desired guard symbols for switching between the first parent node and the second parent node; code 1518 for receiving at least one indication of a number of provided guard symbols from the first and second parent nodes; and code 1520 for switching a communication link from the first parent node to the second parent node in accordance with the at least one indication of provided guard symbols by the first parent node and the second parent node. In certain aspects, the processor 1504 has circuitry configured to implement the code stored in the computer-readable medium/memory 1512. The processor 1504 includes circuitry 1524 for determining a partition of a number of desired guard symbols between a first parent node and a second parent node; circuitry 1526 for sending, to the first parent node and to the second parent node, at least one indication of a partitioned number of desired guard symbols for switching between the first parent node and the second parent node; circuitry 1528 for receiving at least one indication of a number of provided guard symbols from the first and second parent nodes; and circuitry 1530 for switching a communication link from the first parent node to the second parent node in accordance with the at least one indication of provided guard symbols by the first parent node and the second parent node.

For example, means for transmitting (or means for outputting for transmission) may include a transmitter and/or an antenna(s) 234 or the BS 110*a* or the transmitter unit 254 and/or antenna(s) 252 of the UE 120*a* illustrated in FIG. 2 and/or circuitry 1526 of the communication device 1500 in FIG. 15. Means for receiving (or means for obtaining) may include a receiver and/or an antenna(s) 234 of the BS 110*a* or a receiver and/or antenna(s) 252 of the UE 120*a* illustrated in FIG. 2 and/or circuitry 1528 of the communication device 1500 in FIG. 15. Means for communicating may include a transmitter, a receiver or both. Means for generating, means for performing, means for determining, means for taking action, means for determining, means for coordinating may include a processing system, which may include one or more processors, such as the transmit processor 220, the TX MIMO processor 230, the receive processor 238, and/or the controller/processor 240 of the BS 110*a* or the receive processor 258, the transmit processor 264, the TX MIMO processor 266, and/or the controller/processor 280 of the UE 120*a* illustrated in FIG. 2 and/or the processing system 1502 of the communication device 1500 in FIG. 15.

Figure 16:
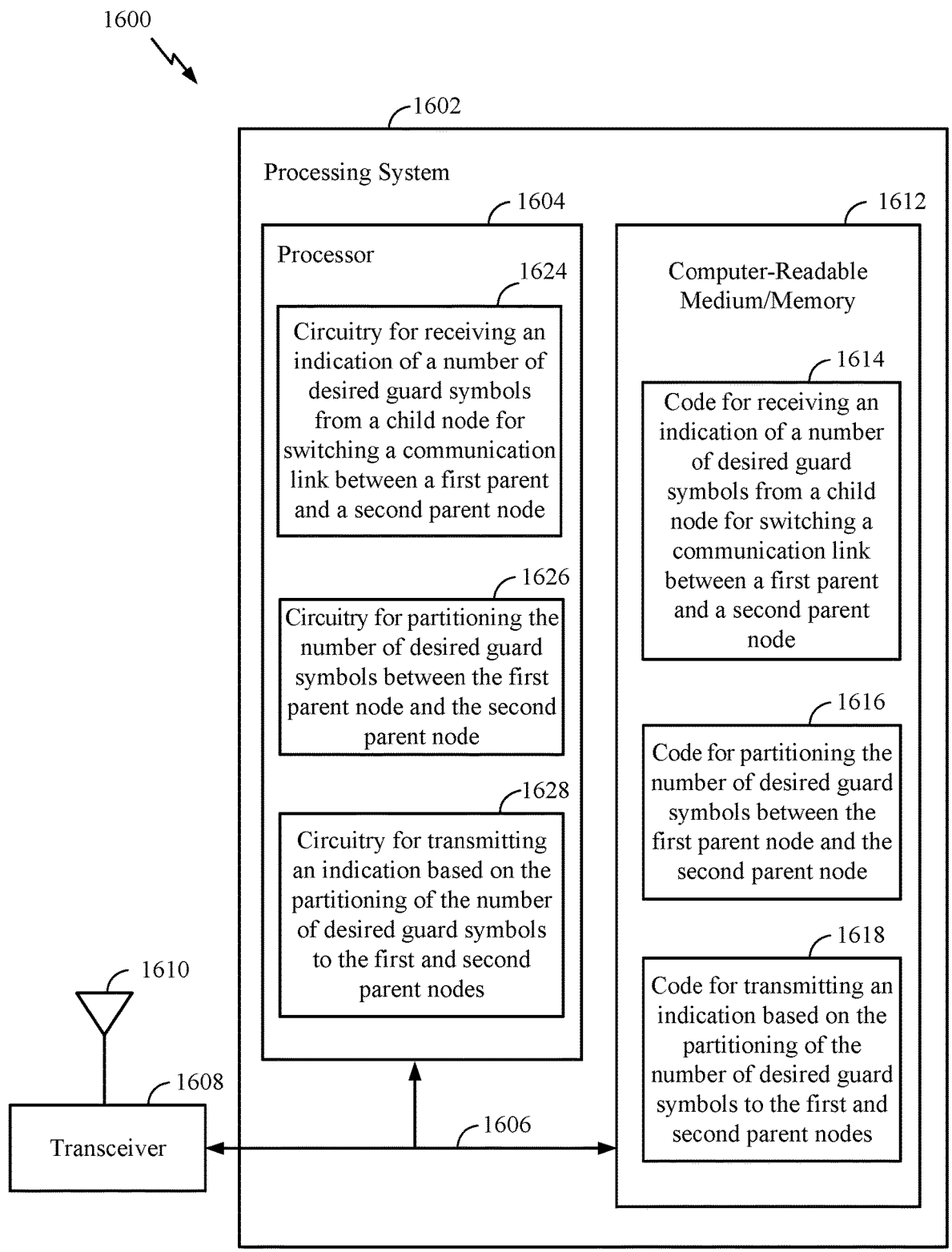
FIG. 16 illustrates a communications device that may include various components configured to perform operations for the techniques disclosed herein in accordance with certain aspects of the present disclosure.

FIG. 16 illustrates a communications device 1600 that may include various components (e.g., corresponding to means-plus-function components) configured to perform operations for the techniques disclosed herein, such as the operations illustrated in FIG. 9. The communications device 1600 includes a processing system 1602 coupled to a transceiver 1608 (e.g., a transmitter and/or a receiver). The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations illustrated in FIG. 9, or other operations for switching a communication link for wireless systems with multiple parents, such as an IAB network. In certain aspects, computer-readable medium/memory 1612 stores code 1614 for receiving an indication of a number of desired guard symbols from a child node for switching a communication link between a first parent node and a second parent node; code 1616 for partitioning the number of desired guard symbols between the first parent node and the second parent node; and code 1618 for transmitting an indication based on the partitioning of the number of desired guard symbols to the first and the second parent nodes. In certain aspects, the processor 1604 has circuitry configured to implement the code stored in the computer-readable medium/memory 1612. The processor 1604 includes circuitry 1624 for receiving an indication of a number of desired guard symbols from a child node for switching a communication link between a first parent node and a second parent node; circuitry 1626 for partitioning the number of desired guard symbols between the first parent node and the second parent node; and circuitry 1628 for transmitting an indication based on the partitioning of the number of desired guard symbols to the first and the second parent nodes.

For example, means for transmitting (or means for outputting for transmission) may include a transmitter and/or an antenna(s) 234 or the BS 110*a* or the transmitter unit 254 and/or antenna(s) 252 of the UE 120*a* illustrated in FIG. 2 and/or circuitry 1628 of the communication device 1600 in FIG. 16. Means for receiving (or means for obtaining) may include a receiver and/or an antenna(s) 234 of the BS 110*a* or a receiver and/or antenna(s) 252 of the UE 120*a* illustrated in FIG. 2 and/or circuitry 1024 of the communication device 1600 in FIG. 16. Means for communicating may include a transmitter, a receiver or both. Means for generating, means for performing, means for determining, means for taking action, means for determining, means for coordinating may include a processing system, which may include one or more processors, such as the transmit processor 220, the TX MIMO processor 230, the receive processor 238, and/or the controller/processor 240 of the BS 110*a* or the receive processor 258, the transmit processor 264, the TX MIMO processor 266, and/or the controller/processor 280 of the UE 120*a* illustrated in FIG. 2 and/or the processing system 1602 of the communication device 1600 in FIG. 16.

Figure 17:
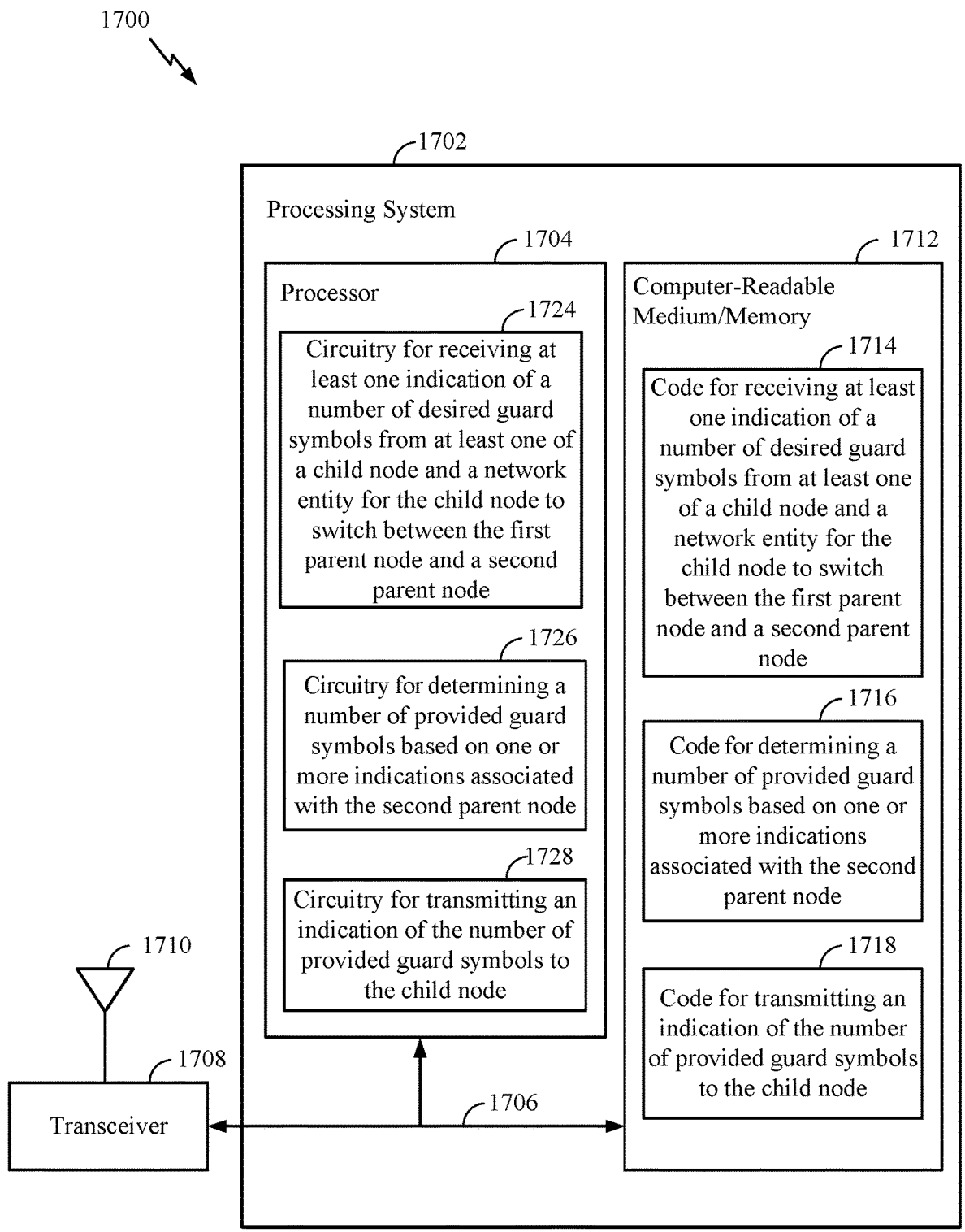
FIG. 17 illustrates a communications device that may include various components configured to perform operations for the techniques disclosed herein in accordance with certain aspects of the present disclosure.

FIG. 17 illustrates a communications device 1700 that may include various components (e.g., corresponding to means-plus-function components) configured to perform operations for the techniques disclosed herein, such as the operations illustrated in FIG. 10. The communications device 1700 includes a processing system 1702 coupled to a transceiver 1708 (e.g., a transmitter and/or a receiver). The transceiver 1708 is configured to transmit and receive signals for the communications device 1700 via an antenna 1710, such as the various signals as described herein. The processing system 1702 may be configured to perform processing functions for the communications device 1700, including processing signals received and/or to be transmitted by the communications device 1700.

The processing system 1702 includes a processor 1704 coupled to a computer-readable medium/memory 1712 via a bus 1706. In certain aspects, the computer-readable medium/memory 1712 is configured to store instructions (e.g., computer-executable code) that when executed by the processor 1704, cause the processor 1704 to perform the operations illustrated in FIG. 10, or other operations for performing the various techniques discussed herein for switching a communication link for wireless systems with multiple parents, such as an IAB network. In certain aspects, computer-readable medium/memory 1712 stores code 1714 for receiving an indication of a number of desired guard symbols from at least one of a child node and a network entity for the child node to switch between a first parent node and a second parent node; code 1716 for determining a number of provided guard symbols based on one or more indications associated with the second parent node; and code 1718 for transmitting an indication of the number of provided guard symbols to the child node. In certain aspects, the processor 1704 has circuitry configured to implement the code stored in the computer-readable medium/memory 1712. The processor 1704 includes circuitry 1724 for receiving an indication of a number of desired guard symbols from at least one of a child node and a network entity for the child node to switch between a first parent node and a second parent node; circuitry 1726 for determining a number of provided guard symbols based on one or more indications associated with the second parent node; and circuitry 1728 for transmitting an indication of the number of provided guard symbols to the child node.

For example, means for transmitting (or means for outputting for transmission) may include a transmitter and/or an antenna(s) 234 or the BS 110a or the transmitter unit 254 and/or antenna(s) 252 of the UE 120a illustrated in FIG. 2 and/or circuitry 1728 of the communication device 1700 in FIG. 17. Means for receiving (or means for obtaining) may include a receiver and/or an antenna(s) 234 of the BS 110a or a receiver and/or antenna(s) 252 of the UE 120a illustrated in FIG. 2 and/or circuitry 1724 of the communication device 1700 in FIG. 17. Means for communicating may include a transmitter, a receiver or both. Means for generating, means for performing, means for determining, means for taking action, means for determining, means for coordinating may include a processing system, which may include one or more processors, such as the transmit processor 220, the TX MIMO processor 230, the receive processor 238, and/or the controller/processor 240 of the BS 110a or the receive processor 258, the transmit processor 264, the TX MIMO processor 266, and/or the controller/processor 280 of the UE 120a illustrated in FIG. 2 and/or the processing system 1702 of the communication device 1700 in FIG. 17.

Example Aspects

In a first aspect, a method for wireless communication by a first node, includes determining a partition of a number of desired guard symbols between a first parent node and a second parent node; sending, to the first parent node and to the second parent node, at least one indication of the number of the desired guard symbols for switching between the first parent node and the second parent node; receiving at least one indication of a number of provided guard symbols from the first and second parent nodes; and switching a communication link from the first parent node to the second parent node in accordance with the at least one indication of provided guard symbols by the first parent node and the second parent node.

In a second aspect, in combination with the first aspect, the number of desired guard symbols for the first parent node is the same as the number of desired guard symbols for the second parent node.

In a third aspect, in combination with one or more of the first and second aspects, determining the partition of the number of desired guard symbols between the first and the second parent nodes comprises: transmitting the indication of the number of desired guard symbols to the first parent node; receiving the indication of the number of provided guard symbols from the first parent node; and determining the number of desired guard symbols for the second parent node based on a number of provided guard symbols from the first parent node.

In a fourth aspect, in combination with one or more of the first through third aspects, receiving an indication of the number of provided guard symbols from the first and the second parent nodes comprises receiving one of a medium access control (MAC) control element (CE); and the number of provided guard symbols corresponds to subcarrier spacing from the first node and a parent node.

In a fifth aspect, in combination with one or more of the first through fourth aspects, the number of provided guard symbols comprises a number of guard symbols provided by the corresponding parent node over a set of switch types, wherein a switch type indicates a change in a mode of operation, wherein the indication of the number of provided guard symbols comprises values for different switch types.

In a sixth aspect, in combination with one or more of the first through fifth aspects, the number of provided guard symbols comprises a number of guard symbols provided by the corresponding parent node over a set of switch types, wherein a switch type indicates a change in a mode of operation, wherein the indication of the number of provided guard symbols comprises values for a first set of switch types, and values for a second set of switch types are derived from one or more switch types within the first set of switch types based on one of: specification and radio resource control (RRC) configured rules.

In a seventh aspect, in combination with one or more of the first through sixth aspects, sending, to the first parent node and to the second parent node, the indication of the number of desired guard symbols comprises sending at least one of the following: a medium access control (MAC) control element (CE); a radio resource control (RRC) message; or an F1 Application Protocol (F1-AP) message.

In an eighth aspect, in combination with one or more of the first through seventh aspects, the first node is at least one of: an IAB node comprising one or more mobile termination (MT) components and a distributed unit (DU); and an access UE.

In a ninth aspect, in combination with one or more of the first through eighth aspects, at least one of the first and second parent nodes is one of: one of an IAB node or an IAB donor in an IAB network; or different TRPs of a parent node of the first node.

In a tenth aspect, in combination one or more of the first through ninth aspects, the method further includes: receiving scheduling information for the first and the second parent nodes; transmitting the scheduling information of the first parent node to the second parent node; and transmitting the scheduling information of the second parent node to the first parent node.

In eleventh aspect, in combination with the tenth aspect, the scheduling information comprises at least one of: a slot format indication (SFI); an availability indication of soft resource (AI); or a scheduling plan; and the scheduling information is transmitted by one of the following: an L1-signaling message via physical uplink control channel (PUCCH) or physical uplink shared channel (PUSCH); and an uplink medium access control (MAC) control element (CE).

In a twelfth aspect, in combination with any one of the first through eleventh aspects, the method further includes providing an indication of potential switch locations for applying guard symbols, wherein the indication indicates a switch type at each potential switch location, wherein a switch type indicates a change in a mode of operation.

In a thirteenth aspect, in combination with any one of the first through twelfth aspects, the method further includes providing an indication of potential switch locations for applying guard symbols, wherein each of the first and the second parent nodes received the indication using a medium access control (MAC) control element (CE).

In a fourteenth aspect, a method for wireless communication by a network entity includes: receiving an indication of a number of desired guard symbols from a child node for switching a communication link between a first parent node and a second parent node; partitioning the number of desired guard symbols between the first parent node and the second parent node; and transmitting an indication based on the partitioning of the number of desired guard symbols to the first and the second parent nodes.

In a fifteenth aspect, in combination with the fourteenth aspect, the network entity is a central unit (CU) of an IAB-donor in an IAB-network.

In a sixteenth aspect, in combination with one or more of the fourteenth and fifteenth aspects, the indication of the number of desired guard symbols is received from and is transmitted using at least one of the following: a radio resource control (RRC) message; or an F1 Application Protocol (F1-AP) message.

In a seventeenth aspect, in combination with one or more of the fourteenth through sixteenth aspects, one of the first and the second parent nodes belongs to a second network entity, and the method further comprising coordinating with the second network entity.

In an eighteenth aspect, in combination with one or more of the fourteenth through seventeenth aspects, the child node transmits scheduling information of the first parent node to the second parent node, and scheduling information of the second parent node to the first parent node.

In a nineteenth aspect, in combination with one or more of the fourteenth through eighteenth aspects, the indication indicates a corresponding number of provided guard symbols based on the partitioning of the number of desired guard symbols to the first and the second parent nodes.

In a twentieth aspect, in combination with one or more of the fourteenth through nineteenth aspects, the indication indicates a corresponding number of desired guard symbols based on the partitioning of the desired guard symbols to the first and the second parent nodes; and wherein each of the first and the second parent nodes sends a number of provided guard symbols to at least one of the child node and the network entity.

In a twenty-first aspect, in combination with one or more of the fourteenth through twentieth aspects, the indication indicates a corresponding number of desired guard symbols based on the partitioning of the desired guard symbols to the first and the second parent nodes, and the method further comprising: transmitting an indication of potential switch locations for applying guard symbols to the first and the second parent nodes.

In a twenty-second aspect, in combination with the twenty-first aspect, the indication indicates a switch type at each potential switch location, wherein a switch type indicates a change in a mode of operation; and the indication of potential switch locations is transmitted using one of the following: an F1 Application Protocol (F1-AP) message; and a medium access control (MAC) control element (CE).

In a twenty-third aspect, in combination with one or more of the fourteenth through twenty-second aspects, the indication indicates a corresponding number of desired guard symbols based on the partitioning of the desired guard symbols to the first and the second parent nodes; wherein the method further comprises: transmitting, to the first parent node, an indication of a time-resource configuration of the second parent node; and transmitting, to the second parent node, an indication of a time-resource configuration of the first parent node.

In a twenty-fourth aspect, in combination with the twenty-third aspect, each indication comprises one or more of the following: a semi-static configuration of at least one of hard resources, soft resources, or not available resources; and a time division duplexing (TDD) configuration; and wherein each indication is transmitted one of the following: an F1 Application Protocol (F1-AP) message; and an Xn message.

In a twenty-fifth aspect, a method for wireless communication by a first parent node includes: receiving at least one indication of a number of desired guard symbols from at least one of a child node and a network entity for the child node to switch between the first parent node and a second parent node; determining a number of provided guard symbols based on one or more indications associated with the second parent node; and transmitting an indication of the number of provided guard symbols to the child node.

In a twenty-sixth aspect, in combination with the twenty-fifth aspect, receiving at least one indication of a number of the desired guard symbols from at least one of a child node and a network entity comprising receiving via at least one of: a medium access control (MAC) control element (CE); a radio resource control (RRC) message; or an F1 Application Protocol (F1-AP) message.

In a twenty-seventh aspect, in combination with one or more of the twenty-fifth and twenty-sixth aspects, the method further includes receiving the one or more indications from at least one of the child node and a central unit (CU), wherein the one or more indications comprises scheduling information of the second parent node.

In a twenty-eight aspect, in combination with one or more of the twenty-fifth through twenty-seventh aspects, one or more indications associated with the second parent node comprises at least one of: a semi-static configuration of at least one of hard resources, soft resources, or not available resources of the second parent node; or a time division duplexing (TDD) configuration of the second parent node; and the method further includes receiving the one or more indications associated with the second parent node via one of the following: an F1 Application Protocol (F1-AP) message; a medium access control (MAC) control element (CE); and an Xn message.

In a twenty-ninth aspect, in combination with one or more of the twenty-fifth through twenty-eighth aspects, the one or more indications indicates potential switch locations for applying guard symbols and a switch type at each potential switch location, wherein a switch type indicates a change in a mode of operation.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UNITS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. ABS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP, an application specific integrated circuit (ASIC), or processor (e.g., a general purpose or specifically programmed process). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 8-10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a first node, comprising:
   determining a partition of a number of desired guard symbols between a first parent node and a second parent node;
   sending, to the first parent node and to the second parent node, at least one indication of the number of the desired guard symbols for switching between the first parent node and the second parent node;
   receiving at least one indication of a number of provided guard symbols from the first and second parent nodes; and
   switching a communication link from the first parent node to the second parent node in accordance with the at least one indication of provided guard symbols by the first parent node and the second parent node.

2. The method of claim 1, wherein the number of desired guard symbols for the first parent node is the same as the number of desired guard symbols for the second parent node.

3. The method of claim 1, wherein determining the partition of the number of desired guard symbols between the first and the second parent nodes comprises:
   transmitting the indication of the number of desired guard symbols to the first parent node;
   receiving the indication of the number of provided guard symbols from the first parent node; and
   determining the number of desired guard symbols for the second parent node based on a number of provided guard symbols from the first parent node.

4. The method of claim 1, wherein:
   receiving an indication of the number of provided guard symbols from the first and the second parent nodes comprises receiving one of a medium access control (MAC) control element (CE); and
   the number of provided guard symbols corresponds to subcarrier spacing from the first node and a parent node.

5. The method of claim 1, wherein the number of provided guard symbols comprises a number of guard symbols provided by the corresponding parent node over a set of switch types, wherein a switch type indicates a change in a mode of operation, wherein the indication of the number of provided guard symbols comprises values for different switch types.

6. The method of claim 1, wherein the number of provided guard symbols comprises a number of guard symbols provided by the corresponding parent node over a set of switch types, wherein a switch type indicates a change in a mode of operation, wherein the indication of the number of provided guard symbols comprises values for a first set of switch types, and values for a second set of switch types are derived from one or more switch types within the first set of switch types based on one of: specification and radio resource control (RRC) configured rules.

7. The method of claim 1, wherein sending, to the first parent node and to the second parent node, the indication of the number of desired guard symbols comprises sending at least one of the following:
   a medium access control (MAC) control element (CE);
   a radio resource control (RRC) message; or
   an F1 Application Protocol (F1-AP) message.

8. The method of claim 1, wherein the first node is at least one of:
   an IAB node comprising one or more mobile termination (MT) components and a distributed unit (DU); and
   an access UE.

9. The method of claim 1, wherein at least one of the first and second parent nodes is one of:
   one of an IAB node or an IAB donor in an IAB network; or
   different TRPs of a parent node of the first node.

10. The method of claim 1, further comprising:
    receiving scheduling information for the first and the second parent nodes;
    transmitting the scheduling information of the first parent node to the second parent node; and
    transmitting the scheduling information of the second parent node to the first parent node.

11. The method of claim 10, wherein:
    the scheduling information comprises at least one of:
      a slot format indication (SFI);
      an availability indication of soft resource (AI); or
      a scheduling plan; and
    the scheduling information is transmitted by one of the following:
      an L1-signaling message via physical uplink control channel (PUCCH) or physical uplink shared channel (PUSCH); and
      an uplink medium access control (MAC) control element (CE).

12. The method of claim 1, further comprising: providing an indication of potential switch locations for applying guard symbols, wherein the indication indicates a switch type at each potential switch location, wherein a switch type indicates a change in a mode of operation.

13. The method of claim 1, further comprising providing an indication of potential switch locations for applying guard symbols, wherein each of the first and the second parent nodes received the indication using a medium access control (MAC) control element (CE).

14. A method for wireless communication by a network entity, comprising:
receiving an indication of a number of desired guard symbols from a child node for switching a communication link between a first parent node and a second parent node;
partitioning the number of desired guard symbols between the first parent node and the second parent node; and
transmitting an indication based on the partitioning of the number of desired guard symbols to the first and the second parent nodes.

15. The method of claim 14, wherein the network entity is a central unit (CU) of an IAB-donor in an IAB-network.

16. The method of claim 14, wherein the indication of the number of desired guard symbols is received from and is transmitted using at least one of the following:
a radio resource control (RRC) message; or
an F1 Application Protocol (F1-AP) message.

17. The method of claim 14, wherein one of the first and the second parent nodes belongs to a second network entity, and the method further comprising coordinating with the second network entity.

18. The method of claim 14, wherein the child node transmits scheduling information of the first parent node to the second parent node, and scheduling information of the second parent node to the first parent node.

19. The method of claim 14, wherein the indication indicates a corresponding number of provided guard symbols based on the partitioning of the number of desired guard symbols to the first and the second parent nodes.

20. The method of claim 14, wherein the indication indicates a corresponding number of desired guard symbols based on the partitioning of the desired guard symbols to the first and the second parent nodes; and wherein each of the first and the second parent nodes sends a number of provided guard symbols to at least one of the child node and the network entity.

21. The method of claim 14, wherein the indication indicates a corresponding number of desired guard symbols based on the partitioning of the desired guard symbols to the first and the second parent nodes, and
the method further comprising:
transmitting an indication of potential switch locations for applying guard symbols to the first and the second parent nodes.

22. The method of claim 21, wherein:
the indication indicates a switch type at each potential switch location, wherein a switch type indicates a change in a mode of operation; and
the indication of potential switch locations is transmitted using one of the following:
an F1 Application Protocol (F1-AP) message; and
a medium access control (MAC) control element (CE).

23. The method of claim 14, wherein the indication indicates a corresponding number of desired guard symbols based on the partitioning of the desired guard symbols to the first and the second parent nodes;
wherein the method further comprises:
transmitting, to the first parent node, an indication of a time-resource configuration of the second parent node; and
transmitting, to the second parent node, an indication of a time-resource configuration of the first parent node.

24. The method of claim 23, wherein
each indication comprises one or more of the following:
a semi-static configuration of at least one of hard resources, soft resources, or not available resources; and
a time division duplexing (TDD) configuration; and
wherein each indication is transmitted one of the following:
an F1 Application Protocol (F1-AP) message; and
an Xn message.

25. A method for wireless communication by a first parent node, comprising:
receiving at least one indication of a number of desired guard symbols from at least one of a child node and a network entity for the child node to switch between the first parent node and a second parent node;
determining a number of provided guard symbols based on one or more indications associated with the second parent node; and
transmitting an indication of the number of provided guard symbols to the child node.

26. The method of claim 25, wherein receiving at least one indication of a number of the desired guard symbols from at least one of a child node and a network entity comprising receiving via at least one of:
a medium access control (MAC) control element (CE);
a radio resource control (RRC) message; or
an F1 Application Protocol (F1-AP) message.

27. The method of claim 25, further comprising receiving the one or more indications from at least one of the child node and a central unit (CU), wherein the one or more indications comprises scheduling information of the second parent node.

28. The method of claim 25, wherein:
one or more indications associated with the second parent node comprises at least one of:
a semi-static configuration of at least one of hard resources, soft resources, or not available resources of the second parent node; or
a time division duplexing (TDD) configuration of the second parent node; and
the method further comprises receiving the one or more indications associated with the second parent node via one of the following:
an F1 Application Protocol (F1-AP) message;
a medium access control (MAC) control element (CE); and
an Xn message.

29. The method of claim 25, wherein the one or more indications indicates potential switch locations for applying guard symbols and a switch type at each potential switch location, wherein a switch type indicates a change in a mode of operation.

30. An apparatus for wireless communication, comprising:
at least one processor; and
memory coupled to the at least one processor, the memory comprising code executable by the at least one processor to cause the apparatus to:
determine a partition of a number of desired guard symbols between a first parent node and a second parent node;
send, to the first parent node and to the second parent node, at least one indication of a number of the desired guard symbols for switching between the first parent node and the second parent node;

receive at least one indication of a number of provided guard symbols from the first and second parent nodes; and switch a communication link from the first parent node to the second parent node in accordance with the at least one indication of provided guard symbols by the first parent node and the second parent node.

* * * * *